(12) United States Patent
Takeshima et al.

(10) Patent No.: US 7,520,126 B2
(45) Date of Patent: Apr. 21, 2009

(54) EXHAUST PURIFICATION METHOD AND EXHAUST PURIFICATION APPARATUS OF INTERNAL COMBUSTION ENGINE

(75) Inventors: Shinicihi Takeshima, Numazu (JP); Toshiaki Tanaka, Numazu (JP); Tetsuya Yamashita, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 544 days.

(21) Appl. No.: 10/544,795

(22) PCT Filed: Feb. 12, 2004

(86) PCT No.: PCT/JP2004/001493

§ 371 (c)(1),
(2), (4) Date: Sep. 14, 2005

(87) PCT Pub. No.: WO2004/074650

PCT Pub. Date: Feb. 9, 2004

(65) Prior Publication Data

US 2006/0137328 A1   Jun. 29, 2006

(30) Foreign Application Priority Data

Feb. 19, 2003   (JP) ............................ 2003-041031

(51) Int. Cl.
*F01N 3/10* (2006.01)
(52) U.S. Cl. .............. 60/301; 60/274; 60/285; 60/295; 60/297; 60/303
(58) Field of Classification Search ............ 60/274, 60/276, 285, 295, 297, 301, 303
See application file for complete search history.

(56) References Cited

U.S. PATENT DOCUMENTS

| | | | |
|---|---|---|---|
| 5,473,887 A | 12/1995 | Takeshima et al. | |
| 6,012,282 A * | 1/2000 | Kato et al. | 60/274 |
| 6,167,696 B1 * | 1/2001 | Maaseidvaag et al. | 60/274 |
| 7,168,242 B2 * | 1/2007 | Uematsu et al. | 60/295 |
| 2003/0181330 A1 | 9/2003 | Yamashita et al. | |
| 2005/0144933 A1 * | 7/2005 | Enoki | 60/277 |
| 2005/0144934 A1 * | 7/2005 | Nakatsuji et al. | 60/295 |
| 2007/0025901 A1 * | 2/2007 | Nakatsuji et al. | 423/239.2 |

FOREIGN PATENT DOCUMENTS

| | | |
|---|---|---|
| EP | 1 166 858 A2 | 1/2002 |
| FI | FN 19992481 * | 11/1999 |
| JP | B2-2600492 | 1/1997 |
| JP | A-2001-012231 | 1/2001 |
| JP | A-2001-342870 | 12/2001 |
| JP | A-2002-115581 | 4/2002 |
| WO | WO 02/36254 A1 | 5/2002 |

* cited by examiner

*Primary Examiner*—Tu M Nguyen
(74) *Attorney, Agent, or Firm*—Oliff & Berridge, PLC

(57) ABSTRACT

In an internal combustion engine, an exhaust passage is provided with a $NO_x$ storing and decomposing catalyst (20). When burning fuel under a lean air-fuel ratio, the nitrogen monoxide is adsorbed by the $NO_x$ storing and decomposing catalyst (20) and disassociated. At this time, the disassociated oxygen is held in the form of oxygen ions $O^-$ on the $NO_x$ storing and decomposing catalyst (20). By making the air-fuel ratio rich and purging part of these oxygen ions $O^-$, the remaining oxygen ions $O^-$ are also purged. Due to this, the $NO_x$ purification performance of the $NO_x$ storing and decomposing catalyst (20) is restored.

23 Claims, 22 Drawing Sheets

EXHAUST PURIFICATION METHOD AND EXHAUST PURIFICATION APPARATUS OF INTERNAL COMBUSTION ENGINE

TECHNICAL FIELD

The present invention relates to an exhaust purification method and exhaust purification apparatus of an internal combustion engine.

BACKGROUND ART

As a catalyst for purifying the $NO_x$ contained in exhaust gas when burning fuel under a lean air-fuel ratio, a catalyst comprised of a catalyst carrier on the surface of which a layer of a $NO_x$ absorbent comprised of an alkali metal or alkali earth is formed and further carrying a precious metal such as platinum on the carrier is known (see Japanese Patent No. 2600492). In this catalyst, when the air-fuel ratio of the exhaust gas is lean, the $NO_x$ contained in the exhaust gas is oxidized by the platinum and absorbed in the $NO_x$ absorbent in the form of nitric acid or nitrous acid. Next, if the combustion chamber or exhaust gas is supplied with a reducing agent and the air-fuel ratio of the exhaust gas is made rich in a short time, the $NO_x$ absorbed in the $NO_x$ absorbent during this time is released and reduced, then if the air-fuel ratio of the exhaust gas is again returned to lean, the action of absorption of $NO_x$ into the $NO_x$ absorbent is started.

However, the majority of the $NO_x$ contained in exhaust gas is nitrogen monoxide NO, therefore with the above-mentioned catalyst, the NO produced in the interval from when the air-fuel ratio of the exhaust gas is made rich to when the air-fuel ratio of the exhaust gas is next made rich, that is, the NO exhausted from the combustion chamber during this interval, is absorbed at the $NO_x$ absorbent in the form of nitric acid or nitrous acid. When the reducing agent is supplied and the air-fuel ratio of the exhaust gas is made rich, the nitric acid or nitrous acid in the $NO_x$ absorbent is decomposed by the reducing agent and released from the $NO_x$ absorbent and reduced. That is, when the air-fuel ratio of the exhaust gas is made rich, an amount of NO commensurate with the reducing agent is released from the $NO_x$ absorbent and reduced.

However, in actuality, the ability of the reducing agent to decompose the nitric acid or nitrous acid is not 100 percent, so to reduce the NO absorbed in the $NO_x$ absorbent, a greater amount of reducing agent than the amount of reducing agent necessary for reducing the NO absorbed in the $NO_x$ absorbent becomes necessary. Therefore, in practice, when using the above-mentioned catalyst, the amount of reducing agent supplied for releasing the NO from the $NO_x$ absorbent is made greater than the amount of the reducing agent necessary for reducing the NO flowing into the catalyst in the interval from when the reducing agent is supplied the previous time to when the reducing agent is supplied the current time.

Now, when the engine is operated at a high speed, the combustion temperature rises, so the amount of generation of $NO_x$ increases, therefore the concentration of NO in the exhaust gas increases. Further, when the engine is operated at a high speed, the amount of NO which the catalyst can hold is reduced. In this way, when the engine is operated at a high speed, the concentration of NO in the exhaust gas increases and the amount of NO which the catalyst can hold is decreased, so the $NO_x$ absorbing ability of the $NO_x$ absorbent ends up becoming saturated in a short time. Therefore, when the engine is operated at a high speed under a lean air-fuel ratio, it is necessary to frequently supply the reducing agent so that the $NO_x$ absorbing ability of the $NO_x$ absorbent does not become saturated.

Therefore, even if burning fuel under a lean air-fuel ratio so as to improve the fuel efficiency, if frequently supplying the reducing agent, the great difference from the fuel efficiency when continuously burning fuel under a stoichiometric air-fuel ratio ends up disappearing. Further, continuously burning fuel under a stoichiometric air-fuel ratio results in better emission, so burning fuel under a lean air-fuel ratio ends up becoming completely meaningless.

DISCLOSURE OF THE INVENTION

An object of the present invention is to provide an exhaust purification method of an internal combustion engine and exhaust purification apparatus able to secure an excellent fuel efficiency and obtain a high $NO_x$ purification rate even if the engine is operated at a high speed under a lean air-fuel ratio.

To achieve the above object, in the present invention, the combustion gas or burned gas in the engine combustion chamber or the exhaust gas exhausted from the engine combustion chamber is brought into contact with the $NO_x$ storing and decomposing catalyst, the nitrogen oxide contained in these gases is adsorbed at the $NO_x$ storing and decomposing catalyst and diassociated to nitrogen and oxygen when burning fuel under a lean air-fuel ratio, the diassociated oxygen is held on the $NO_x$ storing and decomposing catalyst at this time, the disassociated nitrogen is separated from the $NO_x$ storing and decomposing catalyst, the energy necessary for purging part of the oxygen held on the $NO_x$ storing and decomposing catalyst from the $NO_x$ storing and decomposing catalyst is imparted to the $NO_x$ storing and decomposing catalyst to purge part of the oxygen held on the $NO_x$ storing and decomposing catalyst from the $NO_x$ storing and decomposing catalyst, and this purging action induces the remaining oxygen held on the $NO_x$ storing and decomposing catalyst to be purged from the $NO_x$ storing and decomposing catalyst.

Further, in the present invention, a $NO_x$ storing and decomposing catalyst, adsorbing nitrogen oxide contained in combustion gas or burned gas and diassociating it to nitrogen and oxygen when burning fuel under a lean air-fuel ratio and, at this time, holding the disassociated oxygen and separating the disassociated nitrogen, is arranged in an engine combustion chamber or engine exhaust passage, energy imparting means for imparting to the $NO_x$ storing and decomposing catalyst the energy necessary for purging part of the oxygen held on the $NO_x$ storing and decomposing catalyst is provided, the energy necessary for purging part of the oxygen held on the $NO_x$ storing and decomposing catalyst is imparted to the $NO_x$ storing and decomposing catalyst to purge part of the oxygen held on the $NO_x$ storing and decomposing catalyst from the $NO_x$ storing and decomposing catalyst, and this purging action induces the remaining oxygen held on the $NO_x$ storing and decomposing catalyst to be purged from the $NO_x$ storing and decomposing catalyst.

Further, in the present invention, in an internal combustion engine providing an engine exhaust passage with an exhaust purification catalyst and making the air-fuel ratio of an exhaust gas periodically rich in a spike when continuously burning under a lean air-fuel ratio so as to purify the $NO_x$ in the exhaust gas, a $NO_x$ storing and decomposing catalyst diassociating nitrogen monoxide and holding oxygen when burning fuel under a lean air-fuel ratio is used as an exhaust purification catalyst, a reducing agent is periodically supplied in the engine combustion chamber or in the engine exhaust passage upstream of the $NO_x$ storing and decomposing catalyst so as to periodically make the air-fuel ratio of the exhaust gas rich in a spike, and the amount of the periodically supplied reducing agent is smaller than the amount of the reducing agent necessary for reducing the nitrogen monoxide flowing into the $NO_x$ storing and decomposing catalyst in the interval from when the reducing agent is supplied the previous time to when the reducing agent is supplied the current time.

Further, in the present invention, in an internal combustion engine providing an engine exhaust passage with an exhaust purification catalyst and making the air-fuel ratio of an exhaust gas periodically rich in a spike when continuously burning under a lean air-fuel ratio so as to purify the $NO_x$ in the exhaust gas, a $NO_x$ storing and decomposing catalyst diassociating nitrogen monoxide and holding oxygen when burning fuel under a lean air-fuel ratio is used as an exhaust purification catalyst, a reducing agent is periodically supplied in the engine combustion chamber or in the engine exhaust passage upstream of the $NO_x$ storing and decomposing catalyst so as to periodically make the air-fuel ratio of the exhaust gas rich in a spike, and the time interval from when the air-fuel ratio of the exhaust gas is made rich to when the air-fuel ratio of the exhaust gas is next made rich is increased the higher the temperature of the $NO_x$ storing and decomposing catalyst.

BEST MODE FOR WORKING THE INVENTION

Figure 1:
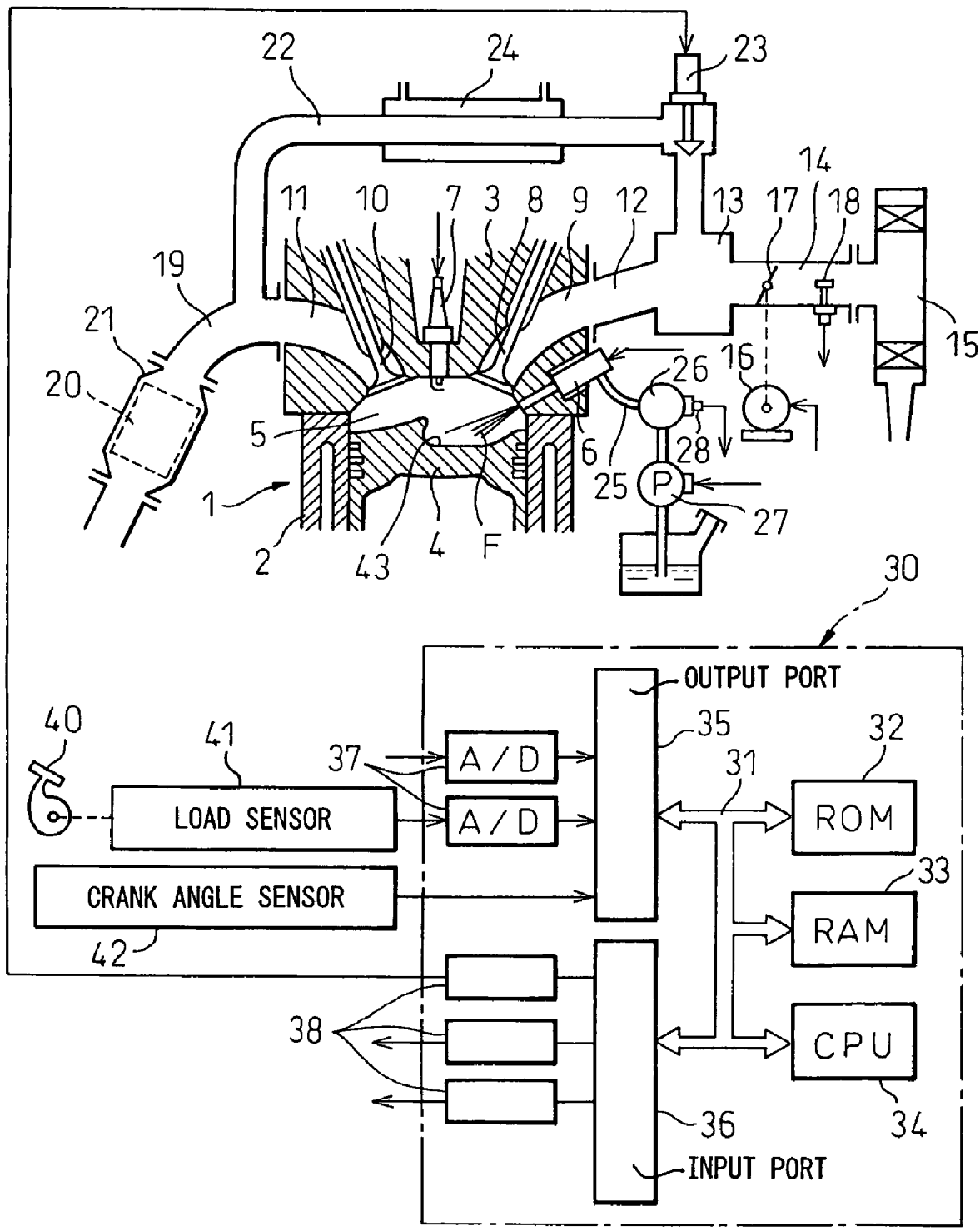
FIG. 1 is an overview of a spark ignition type internal combustion engine.

FIG. 1 shows the case of application of the present invention to a spark ignition type internal combustion engine. Note that the present invention can also be applied to a compression ignition type internal combustion engine.

Referring to FIG. 1, 1 indicates an engine body, 2 a cylinder block, 3 a cylinder head, 4 a piston, 5 a combustion chamber, 6 an electrical control type fuel injector, 7 a spark plug, 8 an intake valve, 9 an intake port, 10 an exhaust valve, and 11 an exhaust port. Each intake port 9 is connected through a corresponding intake branch tube 12 to a surge tank 13, and the surge tank 13 is connected through an intake duct 14 to an air cleaner 15. The intake duct 14 is provided in it with a throttle valve 17 driven by a step motor 16, further, the intake duct 14 is provided inside it with an intake air sensor 18 for detecting a mass flow rate of intake air. On the other hand, the exhaust port 11 is connected through an exhaust manifold 19 to a catalytic converter 21 housing a $NO_x$ storing and decomposing catalyst 20.

The exhaust manifold 19 and the surge tank 13 are connected through an exhaust gas recirculation (hereinafter referred to as an "EGR") passage 22, while the EGR passage 22 is provided with an electrical control type EGR control valve 23. Further, the EGR passage 22 is provided around it with a cooling device 24 for cooling the EGR gas flowing through the EGR passage 22. In the embodiment shown in FIG. 1, the engine cooling water is guided to the cooling device 24, and the engine cooling water cools the EGR gas. On the other hand, each fuel injector 6 is connected through a fuel supply pipe 25 to a fuel reservoir, that is, a common rail 26. This common rail 26 is supplied with fuel from an electrical control type variable discharge fuel pump 27. The fuel supplied into the common rail 26 is supplied through each fuel supply pipe 25 to a fuel injector 6. The common rail 26 is provided with a fuel pressure sensor 28 for detecting the fuel pressure in the common rail 26. The discharge of the fuel pump 27 is controlled based on the output signal of the fuel pressure sensor 28 so that the fuel in the common rail 26 becomes the target fuel pressure.

An electronic control unit 30 is comprised of a digital computer provided with a ROM (read only memory) 32, RAM (random access memory) 33, CPU (microprocessor) 34, input port 35, and output port 36 connected by a bidirectional bus 31. The output signals of the intake air sensor 18 and fuel pressure sensor 28 are input through corresponding AD converters 37 to the input port 35. Further, an accelerator pedal 40 has connected to it a load sensor 41 for generating an output voltage proportional to the amount of depression L of the accelerator pedal 40. The output voltage of the load sensor 41 is input through the corresponding AD converter 37 to the input port 35. Further, the input port 35 has connected to it a crank angle sensor 42 generating an output pulse every time a crank shaft rotates for example by 30°. On the other hand, the output port 36 is connected through a corresponding drive circuit 38 to the fuel injector 6, spark plug 7, throttle valve drive step motor 16, EGR control valve 23, and fuel pump 27.

The top face of the piston 4 is formed with a cavity 43. At the time of engine low load operation, fuel F is injected toward the inside of the cavity 43 from the fuel injector 6. This fuel F is guided by the bottom surface of the cavity 43 and heads toward the spark plug 7. Due to this, the spark plug 7 has an air-fuel mixture formed around it. Next, this air-fuel mixture is ignited by the spark plug 7 and stratified combustion performed. At this time, the average air-fuel ratio in the combustion chamber 5 becomes lean. Therefore, the air-fuel ratio of the exhaust gas also becomes lean.

At the time of engine medium load operation, fuel is injected divided into two between the initial period of the intake stroke and the end period of the compression stroke. By the fuel injection at the initial period of the intake stroke, the combustion chamber 5 is formed inside it with a lean air-fuel mixture expanding throughout the entire combustion chamber, while by the fuel injection at the end period of the compression stroke, the spark plug 7 is formed around it with an air-fuel mixture forming a spark. At this time as well, the average air-fuel ratio in the combustion chamber 5 becomes lean, therefore the air-fuel ratio of the exhaust gas also becomes lean.

On the other hand, at the time of engine high load operation, fuel is injected at the initial period of the intake stroke. Due to this, the combustion chamber 5 is formed inside it with a homogeneous air-fuel mixture. At this time, the air-fuel ratio in the combustion chamber 5 is made lean, the stoichiometric air-fuel ratio, or rich. Normally, the engine is operated at the time of low load or medium load. Therefore, normally, fuel is continuously burned under a lean air-fuel ratio.

In the present invention, when burning fuel under a lean air-fuel ratio, the $NO_x$ exhausted from the combustion chamber 5 is purified by the $NO_x$ storing and decomposing catalyst 20. Therefore, first, this $NO_x$ storing and decomposing catalyst 20 will be explained.

Figure 2A:
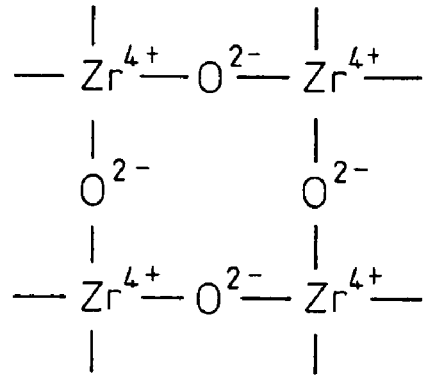
FIGS. 2A to 2C are views for explaining the state of formation of ultrastrong basic points.
Figure 2B:
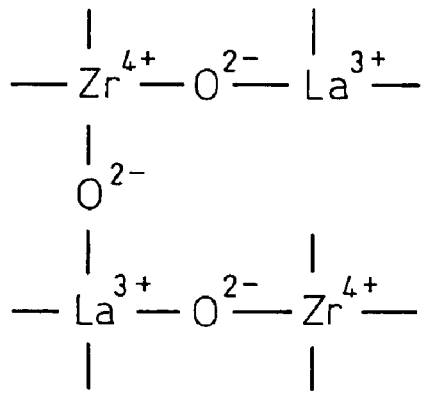

The carrier of this $NO_x$ storing and decomposing catalyst 20 has a crystal structure of zirconium oxide $ZrO_2$ such as shown in FIG. 2A. In the $NO_x$ storing and decomposing catalyst 20 used in the present invention, part of the zirconium Zr in this crystal structure is replaced by a trivalent rare earth metal selected from lanthanum La, neodium Nd, and samarium Sm. Further, the carrier has an alkali metal added to it. In this way, by replacing the zirconium Zr forming the zirconium oxide $ZrO_2$ with a trivalent rare earth metal, for example, lanthanum La, as shown in FIG. 2B, the crystal lattice is formed with oxygen defects with no oxygen $O^{2-}$ present.

Figure 2C:
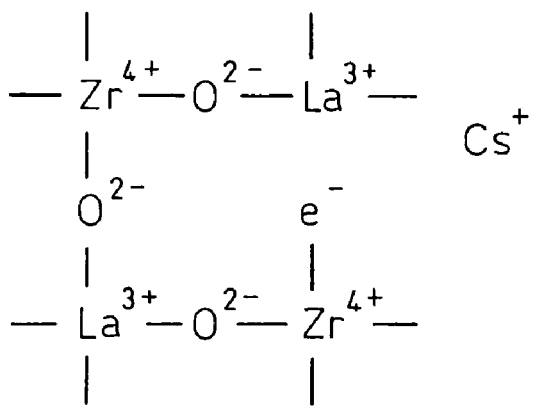

Further, as explained above, the carrier has an alkali metal, for example, cesium Cs, added to it. Due to this cesium Cs, as shown in FIG. 2C, oxygen defects are given electrons $e^-$. Oxygen defects given electrons $e^-$ have extremely strong basicity, therefore the oxygen defects given electrons $e^-$ will be referred to as "ultra-strong basic points" below. FIG. 2C shows the crystal structure of the carrier of the $NO_x$ storing and decomposing catalyst 20 used in the present invention. The carrier has this crystal structure over its entirety. Therefore, the $NO_x$ storing and decomposing catalyst 20 used in the present invention has countless ultrastrong basic points uniformly distributed across it. Note that the carrier of the $NO_x$ storing and decomposing catalyst 20 used in the present invention has added to it aluminum Al for further increasing the heat stability, platinum Pt or another precious metal for promoting the oxidation reduction action, in particular the reduction action, and a metal such as cerium Ce for obtaining the function of a three-way catalyst.

Next, the purification action of $NO_x$ by the $NO_x$ storing and decomposing catalyst 20 when burning fuel under a lean air-fuel ratio will be explained. Note that the mechanism of the $NO_x$ purification action of the $NO_x$ storing and decomposing catalyst 20 is not necessarily clear, but probably the $NO_x$ purification action is performed using the mechanism explained below.

That is, when burning fuel under a lean air-fuel ratio, the exhaust gas contains nitrogen monoxide NO and nitrogen dioxide $NO_2$ or other nitrogen oxides $NO_x$ and excess oxygen $O_2$. In this case, as explained above, the majority of the nitrogen oxide $NO_x$ contained in the exhaust gas is nitrogen monoxide NO, therefore the mechanism of purification of the nitrogen monoxide NO will be explained as a typical example.

Figure 3A:
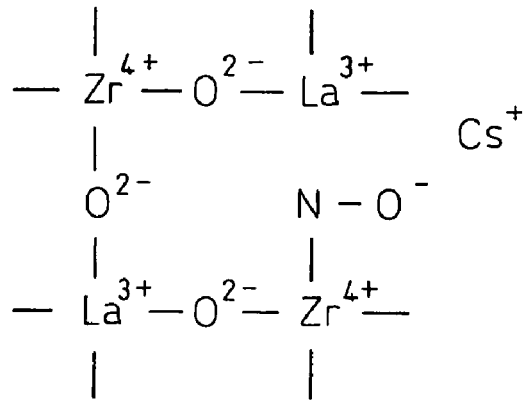
FIGS. 3A to 3D are views for explaining the state of adsorption and disassociation of nitrogen monoxide.
Figure 3B:
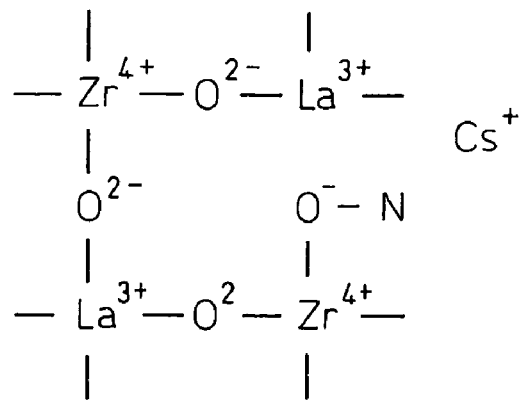

Now, as explained above, the $NO_x$ storing and decomposing catalyst 20 used in the present invention has ultrastrong basic points. If such ultrastrong basic points are present, the acidic nitrogen monoxide NO is attracted to the ultrastrong basic points when the temperature of the $NO_x$ storing and decomposing catalyst 20 is low or high. As a result, nitrogen monoxide NO is trapped at the ultrastrong basic points of the $NO_x$ storing and decomposing catalyst 20 in the form of either FIG. 3A or 3B. In this case, as explained above, the carrier of the $NO_x$ storing and decomposing catalyst 20 has countless ultrastrong basic points uniformly distributed across its entirety, so the $NO_x$ storing and decomposing catalyst 20 adsorbs an extremely large amount of nitrogen monoxide NO.

When nitrogen monoxide NO is adsorbed at the ultrastrong basic points, a disassociation action of the nitrogen monoxide NO and oxidation action of the nitrogen monoxide NO occur. Therefore, first, the disassociation action of the nitrogen monoxide NO will be explained.

Figure 3C:
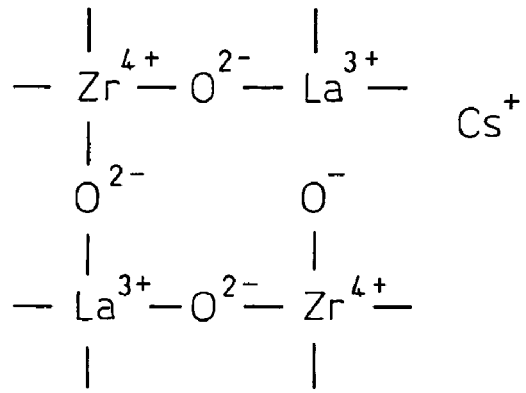

As explained above, the nitrogen monoxide NO in the exhaust gas is attracted by the ultrastrong basic points on the $NO_x$ storing and decomposing catalyst 20 and adsorbed and trapped at the ultrastrong basic points. At this time, the nitrogen monoxide NO is given electrons $e^-$. If the nitrogen monoxide NO is given electrons $e^-$, the N—O bonds of the nitrogen monoxide NO are easily cleaved. In this case, the higher the temperature of the $NO_x$ storing and decomposing catalyst 20, the easier these N—O bonds are cleaved. In practice, if nitrogen monoxide NO is adsorbed at ultrastrong basic points, after a while, the N—O bonds are cleaved to be disassociated to nitrogen N and oxygen O. At this time, the oxygen, as shown in FIG. 3C, remains held at the ultrastrong basic points in the form of oxygen ions $O^-$, and the nitrogen N is separated from the ultrastrong basic points and moves over the $NO_x$ storing and decomposing catalyst 20.

The nitrogen N moving over the $NO_x$ storing and decomposing catalyst 20 bonds with the nitrogen N of the nitrogen monoxide NO adsorbed on the other ultrastrong basic points of the $NO_x$ storing and decomposing catalyst 20 or the other nitrogen N moving over the $NO_x$ storing and decomposing catalyst 20 to form nitrogen molecules $N_2$ and separates from the $NO_x$ storing and decomposing catalyst 20. In this way, the $NO_x$ is purified.

However, if the nitrogen monoxide NO is adsorbed at the ultrastrong basic points, after a while, the nitrogen monoxide NO is disassociated and the oxygen O is trapped on the ultrastrong basic points in the form of oxygen ions $O^-$, so the ultrastrong basic points present on the $NO_x$ storing and decomposing catalyst 20 gradually are buried by oxygen ions $O^-$. In this way, if the ultrastrong basic points are buried by oxygen ions $O^-$, the nitrogen monoxide NO in the exhaust gas bonds with the nitrogen N of the nitrogen monoxide NO adsorbed at the ultrastrong basic points and as a result $N_2O$ is generated.

Next, the oxidation reaction of the nitrogen monoxide NO in the $NO_x$ storing and decomposing catalyst 20 will be explained.

When burning fuel under a lean air-fuel ratio, the exhaust gas contains excess oxygen $O_2$. Therefore, the nitrogen monoxide N—$O^-$ adsorbed at the ultrastrong basic points is oxidized by the excess oxygen $O_2$. Due to this, nitrate ions $NO_3^-$ are formed. That is, if the oxygen concentration in the exhaust gas is high, the reaction proceeds in a direction generating nitrate ions $NO_3^-$. Therefore, when burning fuel under a lean air-fuel ratio, nitrate ions $NO_3^-$ are generated and held at part of the ultrastrong basic points. Note that nitrate ions $NO_3^-$ are produced by the nitrogen monoxide NO bonding with the oxygen ions $O^{2-}$ forming crystals, while the generated nitrate ions $NO_3^-$ are adsorbed on the zirconium $Zr^{4+}$ forming the crystals and are held on the $NO_x$ storing and decomposing catalyst 20 in that state.

However, the nitrate ions $NO_3^-$ decompose when the temperature become higher and are released in the form of nitrogen monoxide NO. Therefore, when the temperature of the $NO_x$ storing and decomposing catalyst 20 becomes higher, the $NO_x$ storing and decomposing catalyst 20 has almost no nitrate ions $NO_3^-$ present on it any longer. When the $NO_x$ storing and decomposing catalyst 20 no longer has almost any nitrate ions $NO_3^-$ present on it in this way, when the lower limit temperature of the $NO_x$ storing and decomposing catalyst 20 is referred to as the reference temperature, this reference temperature is determined by the $NO_x$ storing and decomposing catalyst 20. In the $NO_x$ storing and decomposing catalyst 20 used in the present invention, this reference temperature is substantially 600° C. That is, when the temperature of the $NO_x$ storing and decomposing catalyst 20 is lower than this reference temperature, the $NO_x$ storing and decomposing catalyst 20 has nitrate ions $NO_3^-$ generated on this. When the temperature of the $NO_x$ storing and decomposing catalyst 20 is higher than this reference temperature, the $NO_x$ storing and decomposing catalyst 20 no longer has almost any nitrate ions $NO_3^-$ present on it.

On the other hand, when burning fuel under a lean air-fuel ratio, the excess oxygen $0_2$ contained in the exhaust gas causes the metal, for example, cerium Ce, carried on the $NO_x$ storing and decomposing catalyst 20 to be oxidized ($Ce_2O_3$+ $1/2O_2 \rightarrow 2CeO_2$). Due to this, the $NO_x$ storing and decomposing catalyst 20 stores oxygen on this. This stored oxygen stably invades the crystal structure. Therefore, this stored oxygen does not separate from the $NO_x$ storing and decomposing catalyst 20 even if the $NO_x$ storing and decomposing catalyst 20 rises in temperature.

Summarizing the explanation up to now, when burning under a lean air-fuel ratio and the temperature of the $NO_x$ storing and decomposing catalyst 20 is higher than the reference temperature, the $NO_x$ storing and decomposing catalyst 20 holds $O^-$ or still not disassociated nitrogen monoxide NO at the ultrastrong basic points oxygen ions, and the $NO_x$ storing and decomposing catalyst 20 holds the stored oxygen. However, at this time, the $NO_x$ storing and decomposing catalyst 20 has almost no nitrate ions $NO_3^-$ present on it.

As opposed to this, when burning fuel under a lean air-fuel ratio and the temperature of the $NO_x$ storing and decomposing catalyst 20 is lower than the reference temperature, the $NO_x$ storing and decomposing catalyst 20 holds oxygen ions $O^-$ or still not disassociated nitrogen monoxide NO at the ultrastrong basic points, while the $NO_x$ storing and decomposing catalyst 20 holds stored oxygen. However, at this time, a large amount of nitrate ions $NO_3^-$ is generated on the $NO_x$ storing and decomposing catalyst 20.

That is, in other words, when the temperature of the $NO_x$ storing and decomposing catalyst 20 is lower than the reference temperature, the nitrogen monoxide NO in the exhaust gas changes to nitrate ions $NO_3^-$ on the $NO_x$ storing and decomposing catalyst 20, therefore at this time, the $NO_x$ storing and decomposing catalyst 20 has a large amount of nitrate ions $NO_3^-$ present on it, but the oxygen ions $O^-$ held on the $NO_x$ storing and decomposing catalyst 20 are comparatively small.

As opposed to this, when the temperature of the $NO_x$ storing and decomposing catalyst 20 is higher than the reference temperature, the nitrate ions $NO_3^-$ end up immediately breaking up even if formed, therefore the $NO_x$ storing and decomposing catalyst 20 does not have almost any nitrate ions $NO_3^-$ on it. On the other hand, at this time, the disassociation action of the nitrogen monoxide NO adsorbed on the ultrastrong basic points on the $NO_x$ storing and decomposing catalyst 20 is actively performed, therefore the amount of the oxygen ions $O^-$ trapped at the ultrastrong basic points gradually increases.

Next, the treatment for restoration of the $NO_x$ purification performance of the $NO_x$ storing and decomposing catalyst 20 will be explained. This restoration treatment changes in accordance with the temperature of the $NO_x$ storing and decomposing catalyst 20, therefore first the case where the temperature of the $NO_x$ storing and decomposing catalyst 20 is higher than the reference temperature will be explained.

When burning fuel under a lean air-fuel ratio and the temperature of the $NO_x$ storing and decomposing catalyst 20 is higher than the reference temperature, as explained above, the ultrastrong basic points of the $NO_x$ storing and decomposing catalyst 20 hold the disassociated oxygen ions $O^-$. Therefore, if continuously burning fuel under a lean air-fuel ratio, the ultrastrong basic points of the $NO_x$ storing and decomposing catalyst 20 gradually are buried by oxygen ions $O^-$, therefore the number of the ultrastrong basic points which the nitrogen monoxide NO can be adsorbed at gradually is reduced. As a result, the $NO_x$ purification rate gradually falls.

Figure 3D:
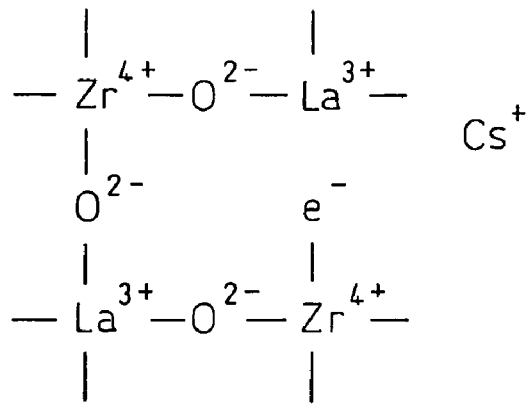

In this case, if disassociating, that is, purging the oxygen ions $O^-$ held at the ultrastrong basic points, the $NO_x$ storing and decomposing catalyst 20, as shown in FIG. 3D, returns to the original form where oxygen defects are given electrons $e^-$. Therefore, a high $NO_x$ purification rate is obtained.

However, as will be understood from FIG. 3C, the ultrastrong basic points are positioned between electrically plus metal ions, therefore electrically minus oxygen ions $O^-$ are easily held between these metal ions. However, the bonding force between the oxygen ions $O^-$ and metal ions is weak, therefore the oxygen ions $O^-$ are extremely unstable in state. If part of the oxygen ions $O^-$ in the oxygen ions held at the ultrastrong basic points is purged from the ultrastrong basic points, this purging action induces the remaining oxygen ions $O^-$ held at the ultrastrong basic points to be purged all at once. However, at this time, the oxygen stored at the $NO_x$ storing and decomposing catalyst 20 is not purged.

The mechanism by which the purging action of part of the oxygen ions induces the remaining oxygen ions $O^-$ to be purged all at once in this way is not clear, but probably the energy released when the purged part of the oxygen ions forms stable oxygen atoms causes the remaining oxygen ions $O^-$ to be purged all at once. In fact, the fact that by imparting the energy necessary for purging part of the oxygen ions $O^-$ held on the $NO_x$ storing and decomposing catalyst 20 from the $NO_x$ storing and decomposing catalyst 20 to the $NO_x$ storing and decomposing catalyst 20 so as to purge part of the oxygen ions $O^-$ held on the $NO_x$ storing and decomposing catalyst 20 from the $NO_x$ storing and decomposing catalyst 20, this purging action induces the remaining oxygen ions $O^-$ held on the $NO_x$ storing and decomposing catalyst 20 to be purged all at once from the $NO_x$ storing and decomposing catalyst 20 has been confirmed by experiments. Note that if energy is imparted, the action of disassociation of nitrogen monoxide NO at the ultrastrong basic points is promoted and therefore oxygen ions $O^-$ disassociated from the adsorbed nitrogen monoxide NO are purged.

That is, there is no need to impart the energy necessary for purging all of the oxygen ions $O^-$ in order to purge all of the oxygen ions $O^-$ held on the $NO_x$ storing and decomposing catalyst 20. It is sufficient to impart the energy necessary for purging part of the oxygen ions $O^-$ in these oxygen ions $O^-$, so there is the great advantage that a smaller energy for purging the oxygen ions $O^-$ is enough.

Note that various types of energy may be considered as the energy to be imparted. For example, if making the exhaust gas temperature or temperature of the $NO_x$ storing and decomposing catalyst 20 a high temperature, the oxygen ions $O^-$ held on the $NO_x$ storing and decomposing catalyst 20 are purged. Therefore, as the energy imparted, it is possible to use heat energy.

Figure 4:
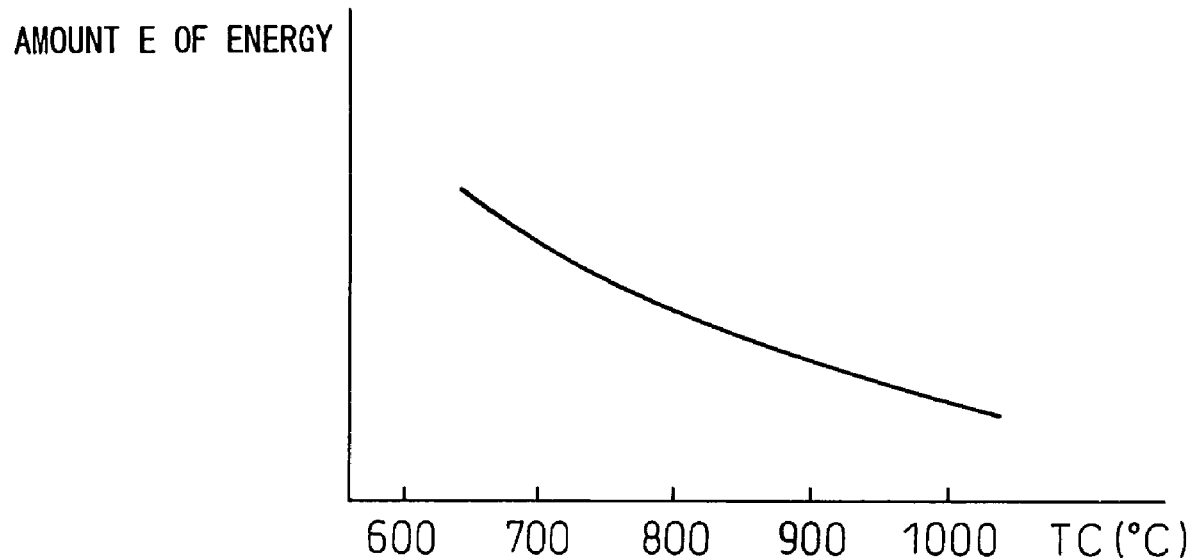
FIG. 4 is a view of the relationship between the amount of energy imparted and the temperature of the $NO_x$ storing and decomposing catalyst.

The oxygen ions $O^-$ held at the $NO_x$ storing and decomposing catalyst 20 become easier to separate when the temperature of the $NO_x$ storing and decomposing catalyst 20 becomes higher. Therefore, as shown in FIG. 4, the amount of energy E necessary for puring part of the oxygen ions $O^-$ held on the $O_x$ storing and decomposing catalyst 20 from the $NO_x$ storing and decomposing catalyst 20 becomes smaller the higher the temperature TC of the $NO_x$ storing and decomposing catalyst 20.

As explained above, when the temperature of the $NO_x$ storing and decomposing catalyst 20 is higher than the reference temperature, if continuing to burn fuel under a lean air-fuel ratio, the ultrastrong basic points of the $NO_x$ storing and decomposing catalyst 20 gradually become buried by oxygen ions $O^-$, therefore the number of ultrastrong basic points where nitrogen monoxide NO can be adsorbed gradually is reduced. As a result, the purification rate of $NO_x$ gradually declines. Therefore, in this embodiment of the present invention, to purge the oxygen ions $O^-$ held on the $NO_x$ storing and decomposing catalyst 20 before the $NO_x$ storing and decomposing catalyst 20 is buried by oxygen ions $O^-$, energy is periodically imparted to the $NO_x$ storing and decomposing catalyst 20.

In this case, it is possible to impart energy at every predetermined time period, every time the cumulative value of the engine speed exceeds a set value, or every time the running distance of the vehicle exceeds a certain distance. Further, in this case, it is possible to increase the time interval from when the $NO_x$ storing and decomposing catalyst 20 is given energy to when energy is next given the higher the temperature of the $NO_x$ storing and decomposing catalyst 20.

Figure 5:
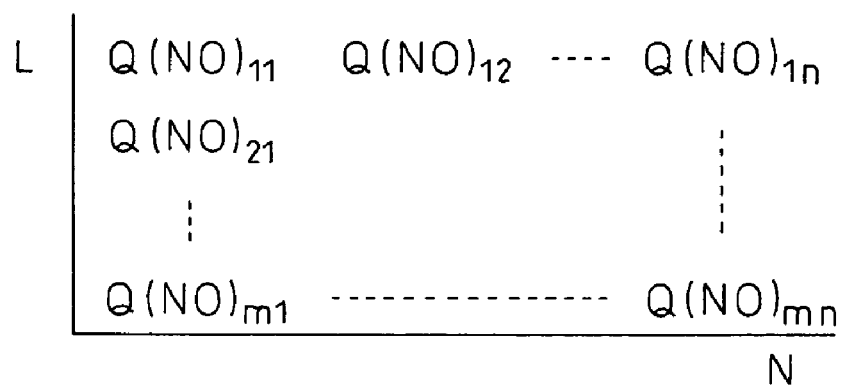
FIG. 5 is a view of a map of the amount of nitrogen monoxide in the exhaust gas.

Further, it is possible to estimate the total amount of the oxygen ions $O^-$ and nitrogen monoxide NO held at the $NO_x$ storing and decomposing catalyst 20 and impart energy when this estimated total exceeds a set amount. That is, the nitrogen monoxide NO included in the exhaust gas is held in that form or in the form of oxygen ions $O^-$ after disassociation on the $NO_x$ storing and decomposing catalyst 20. Therefore, the total of the oxygen ions $O^-$ and nitrogen monoxide NO held on the $NO_x$ storing and decomposing catalyst 20 becomes the cumulative amount of the nitrogen monoxide NO contained in the exhaust gas. Note that the amount of the nitrogen monoxide NO contained in the exhaust gas is determined in accordance with the operating state of the engine. FIG. 5 shows the amount Q(NO) of the nitrogen monoxide exhausted from the engine per unit time found from experiments in the form of a map as a function of the engine load L and engine speed N.

When using such a map, the total of the oxygen ions $O^-$ and nitrogen monoxide NO held at the $NO_x$ storing and decomposing catalyst 20 can be estimated from the cumulative value of the amount Q(NO) of the nitrogen monoxide shown in FIG. 5. Therefore, in this embodiment of the present invention, the cumulative value of the amount Q(NO) of the nitrogen monoxide shown in FIG. 5 is used as the estimated total of the oxygen ions $O^-$ and nitrogen monoxide NO held in the $NO_x$ storing and decomposing catalyst 20.

Figure 6:
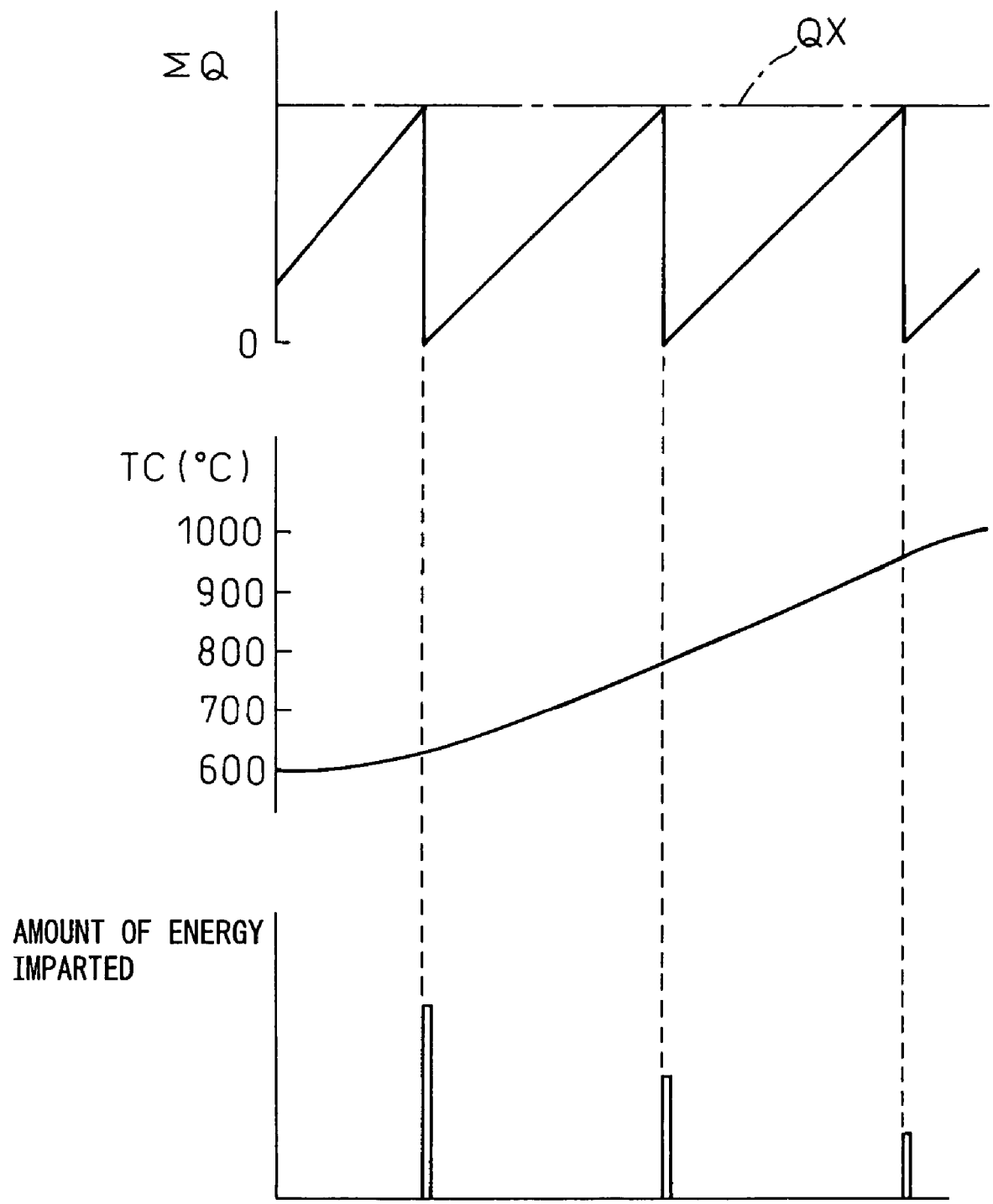
FIG. 6 is a view of the amount of energy imparted.

FIG. 6 shows the relationship between the cumulative value $\Sigma Q$ of the Q(NO) shown in FIG. 5, the temperature TC of the $NO_x$ storing and decomposing catalyst 20, and the imparted energy when the temperature of the $NO_x$ storing and decomposing catalyst 20 is higher than the reference temperature.

From FIG. 6, energy is imparted when the cumulative value $\Sigma Q$ of the oxygen ions $O^-$ and nitrogen monoxide NO held on the $NO_x$ storing and decomposing catalyst 20 exceeds a set amount QX. At this time, the oxygen ions $O^-$ held at the $NO_x$ storing and decomposing catalyst 20 are purged. Further, if energy is imparted, the disassociation action of the nitrogen monoxide NO adsorbed at the $NO_x$ storing and decomposing catalyst 20 is promoted. At this time, the disassociated oxygen ions $O^-$ are purged. Further, as explained above, the higher the temperature of the $NO_x$ storing and decomposing catalyst 20, the easier it is to purge the oxygen ions $O^-$ when imparting energy, therefore when the amount of oxygen ions $O^-$ held on the $NO_x$ storing and decomposing catalyst 20 is the same, the higher the temperature of the $NO_x$ storing and decomposing catalyst 20, the smaller the energy required to purge all of the oxygen ions $O^-$. Therefore, as shown in FIG. 6, the amount of energy imparted to the $NO_x$ storing and decomposing catalyst 20 can be reduced the higher the temperature TC of the $NO_x$ storing and decomposing catalyst 20.

Figure 7:
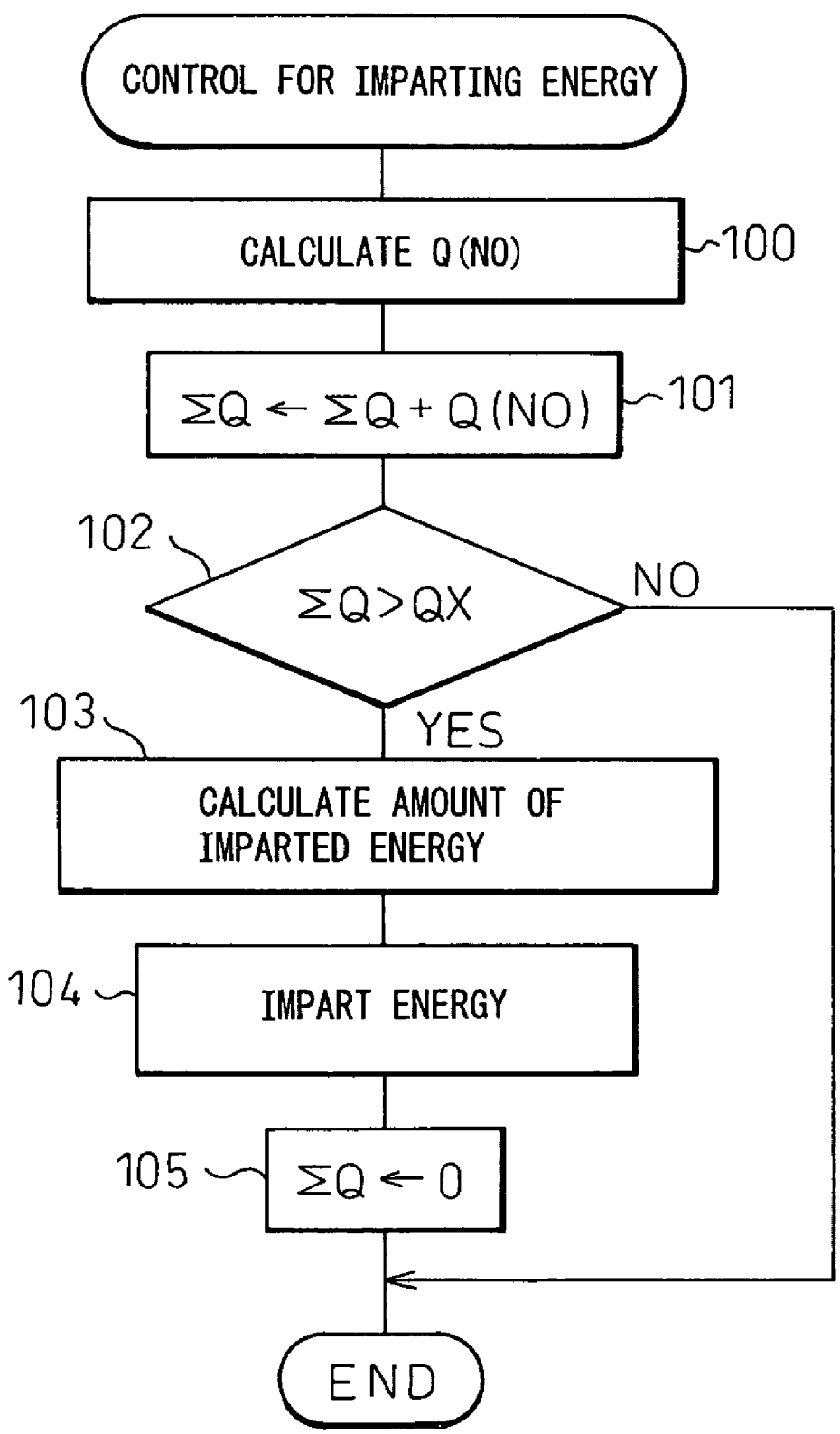
FIG. 7 is a flow chart of control of imparting energy.

FIG. 7 shows the routine for control of imparting energy.

Referring to FIG. 7, first at step 100, the amount Q(NO) of nitrogen monoxide is calculated from the map shown in FIG. 5. Next, at step 101, $\Sigma Q$ is incremented by Q(NO) to calculate the cumulative amount $\Sigma Q$. Next, at step 102, it is judged if the cumulative amount $\Sigma Q$ exceeds the set amount QX. When $\Sigma Q > QX$, the routine proceeds to step 103, where the amount of energy to be imparted is calculated. Next, at step 104, the energy is imparted. Next, at step 105, $\Sigma Q$ is cleared.

Next, a second embodiment designed so that the energy to be imparted is generated by the reducing agent to be supplied in the combustion chamber 5 or in the exhaust gas, oxygen ions $O^-$ held on the $NO_x$ storing and decomposing catalyst 20 are purged from the $NO_x$ storing and decomposing catalyst 20 when burning fuel under a lean air-fuel ratio and the temperature of the $NO_x$ storing and decomposing catalyst 20 is higher than the reference temperature determined by the $NO_x$ storing and decomposing catalyst 20, and, at that time, the combustion chamber 5 or exhaust gas is supplied with a reducing agent to make the air-fuel ratio in the combustion chamber 5 or the air-fuel ratio of the exhaust gas rich in a spike.

In this case, it is possible to supply the reducing agent so as to make air-fuel ratio in the combustion chamber 5 or the air-fuel ratio of the exhaust gas rich periodically, for example every predetermined period, every time the cumulative value of the speed of the engine exceeds a set value, or every time the running distance of the vehicle exceeds a certain distance.

Figure 8:
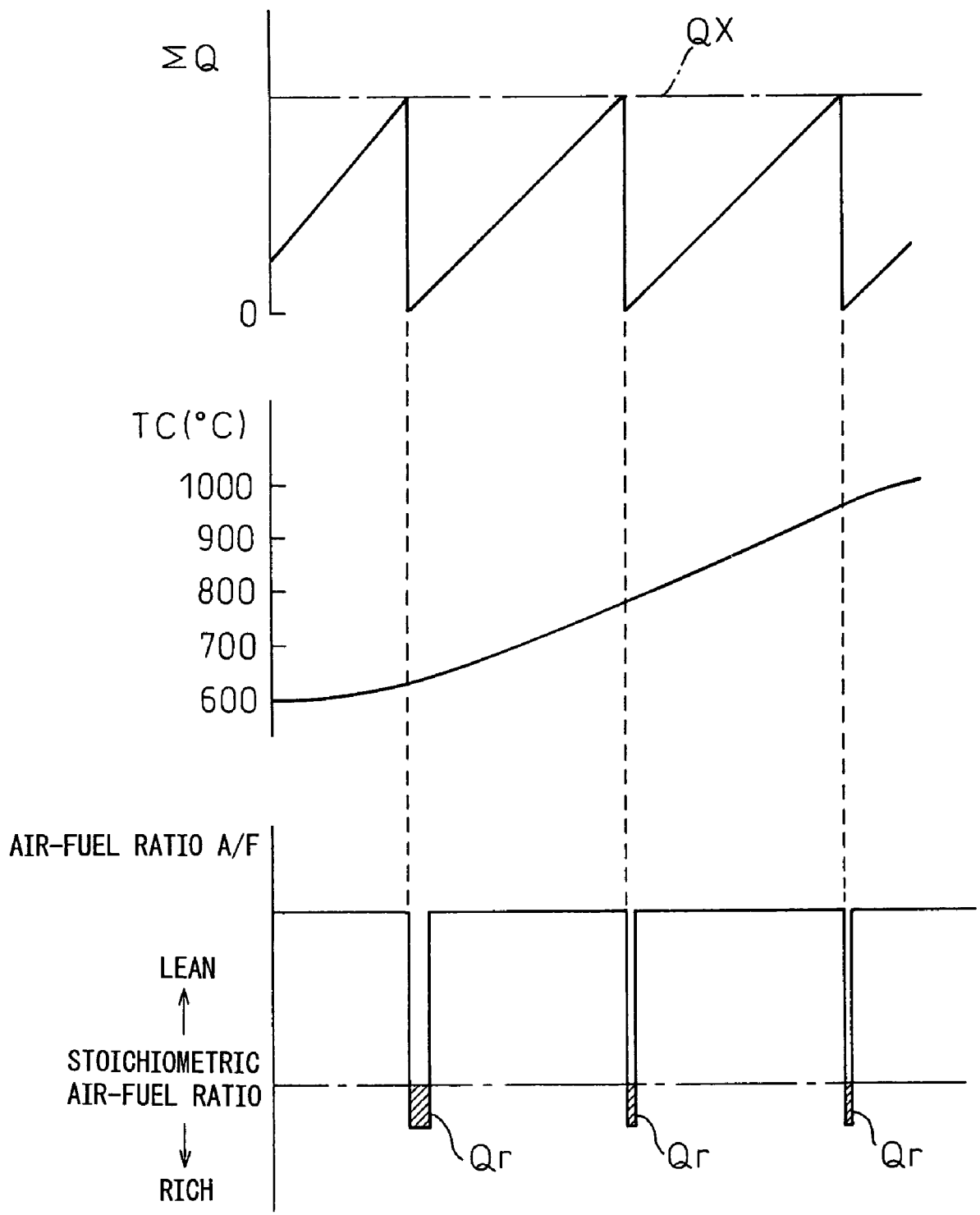
FIG. 8 is a view of rich control of the air-fuel ratio.

On the other hand, in this second embodiment as well, it is possible to perform rich control of the air-fuel ratio based on the total cumulative value of the oxygen ions $O^-$ and nitrogen monoxide NO held on the $NO_x$ storing and decomposing catalyst 20. FIG. 8 shows the case of such rich control.

That is, as shown in FIG. 8, when the total cumulative amount $\Sigma Q$ of the oxygen ions $O^-$ and nitrogen monoxide NO held on the $NO_x$ storing and decomposing catalyst 20 exceeds the set amount QX, the combustion chamber 5 or exhaust gas is supplied with the reducing agent to make the air-fuel ratio of the combustion chamber 5 or the exhaust gas A/F rich in a spike. Due to this, the oxygen ions $O^-$ held on the $NO_x$ storing and decomposing catalyst 20 are purged.

In the second embodiment, as the reducing agent, fuel containing hydrocarbons etc. is used. In this case, the fuel acting as the reducing agent is the amount of fuel forming an excess with respect to the stoichiometric air-fuel ratio. That is, referring to FIG. 8, the part at the rich side of the stoichiometric air-fuel ratio shown by the hatching shows the amount Qr of the reducing agent. This reducing agent may be supplied in the combustion chamber 5 by increasing the amount of injection from the fuel injector 6 and may be supplied into the exhaust gas exhausted from the combustion chamber 5.

When burning fuel under a lean air-fuel ratio and the temperature of the $NO_x$ storing and decomposing catalyst 20 is higher than the reference temperature determined by the $NO_x$ storing and decomposing catalyst 20, if supplying the reducing agent necessary for making part of the oxygen held on the $NO_x$ storing and decomposing catalyst 20 separate from the $NO_x$ storing and decomposing catalyst 20 to the $NO_x$ storing and decomposing catalyst 20, the remaining oxygen held on the $NO_x$ storing and decomposing catalyst 20 is purged from the $NO_x$ storing and decomposing catalyst 20. The phenomenon at this time will be explained in a bit more detail while referring to FIG. 9.

Figure 9:
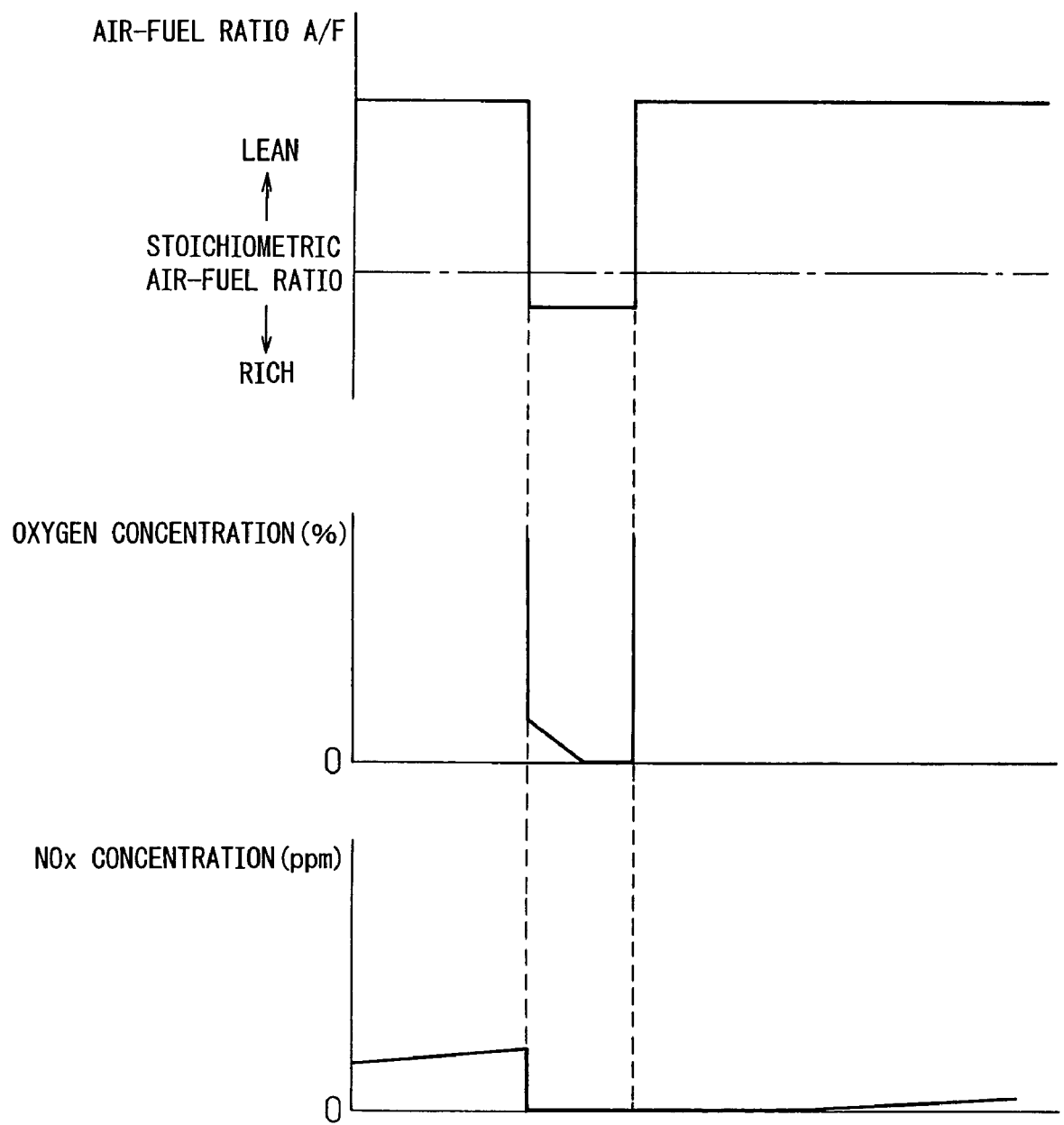
FIG. 9 is a time chart of the change in the oxygen concentration and $NO_x$ concentration.

FIG. 9 shows the change in the oxygen concentration (%) and change in the $NO_x$ concentration (ppm) in the exhaust gas flowing out from the $NO_x$ storing and decomposing catalyst 20 when the air-fuel ratio A/F of the exhaust gas flowing into the $NO_x$ storing and decomposing catalyst 20 is maintained lean and when it is made rich in a spike.

As explained above, when burning fuel under a lean air-fuel ratio and the temperature of the $NO_x$ storing and decomposing catalyst 20 is higher than the reference temperature, the $NO_x$ storing and decomposing catalyst 20 holds the oxygen ions $O^-$ and nitrogen monoxide NO, and the $NO_x$ storing and decomposing catalyst 20 holds the stored oxygen. However, the $NO_x$ storing and decomposing catalyst 20 has almost no nitrate ions $NO_3^-$ present on it.

In this state, when the air-fuel ratio A/F is switched from lean to rich, part of the oxygen ions $O^-$ held at the $NO_x$ storing and decomposing catalyst 20 is separated from the ultrastrong basic points. This separation action of these oxygen ions $O^-$ induces the remaining oxygen ions $O^-$ to be separated all at once. Even when the air-fuel ratio A/F becomes rich, the exhaust gas usually contains unburned oxygen, but if ignoring this unburned oxygen, when the air-fuel ratio A/F is switched from lean to rich, if an ordinary catalyst, the oxygen concentration of the exhaust gas flowing out from the catalyst becomes zero.

However, with the $NO_x$ storing and decomposing catalyst 20 used in the present invention, if the air-fuel ratio A/F is switched from lean to rich, the oxygen ions $O^-$ held at the $NO_x$ storing and decomposing catalyst 20 are separated, so at this time, the oxygen concentration in the exhaust gas flowing out from the $NO_x$ storing and decomposing catalyst 20 will not become zero due to the effects of the oxygen ions $O^-$ separated as shown in FIG. 9. That is, when the air-fuel ratio A/F is switched from lean to rich, the separated part of the oxygen ions $O^-$ is reduced, but the separated majority of the oxygen ions $O^-$ is not reduced by the reducing agent, but is exhausted in the form of oxygen atoms $O_2$ from the $NO_x$ storing and decomposing catalyst 20, therefore as shown in FIG. 9, when the air-fuel ratio A/F is switched from lean to rich, the oxygen concentration in the exhaust gas flowing out from the $NO_x$ storing and decomposing catalyst 20 becomes a certain amount. Next, since the amount of oxygen ions $O^-$ disassociated becomes smaller along with the elapse of time, the oxygen concentration is gradually reduced to zero as shown in FIG. 9. Once reduced to zero, while the air-fuel ratio A/F is made rich thereafter, the oxygen concentration is maintained at zero.

On the other hand, if the air-fuel ratio A/F is switched from lean to rich, part of the nitrogen monoxide NO held at the ultrastrong basic points of the $NO_x$ storing and decomposing catalyst 20 is disassociated and the disassociated oxygen ions $O^-$ are separated. Further, at this time, the remaining nitrogen monoxide NO is reduced by the reducing agent and decomposed into nitrogen and carbon dioxide and, further, the oxygen $O^{2-}$ stored in the $NO_x$ storing and decomposing catalyst 20 is reduced by the reducing agent. Therefore, as shown in FIG. 9, while the air-fuel ratio A/F is made rich, the $NO_x$ concentration of the exhaust gas flowing out from the $NO_x$ storing and decomposing catalyst 20 becomes zero.

In this way, if supplying a reducing agent, it is possible to purge part of the oxygen ions $O^-$ from the $NO_x$ storing and decomposing catalyst 20. This purging action induces the remaining oxygen ions $O^-$ held on the $NO_x$ storing and decomposing catalyst 20 to be purged from the $NO_x$ storing and decomposing catalyst 20. Further, if supplying the reducing agent, it is possible to reduce the nitrogen monoxide NO adsorbed on the $NO_x$ storing and decomposing catalyst 20. Therefore, generating the imparted energy by the reducing agent can be said to be extremely preferable.

Figure 10:
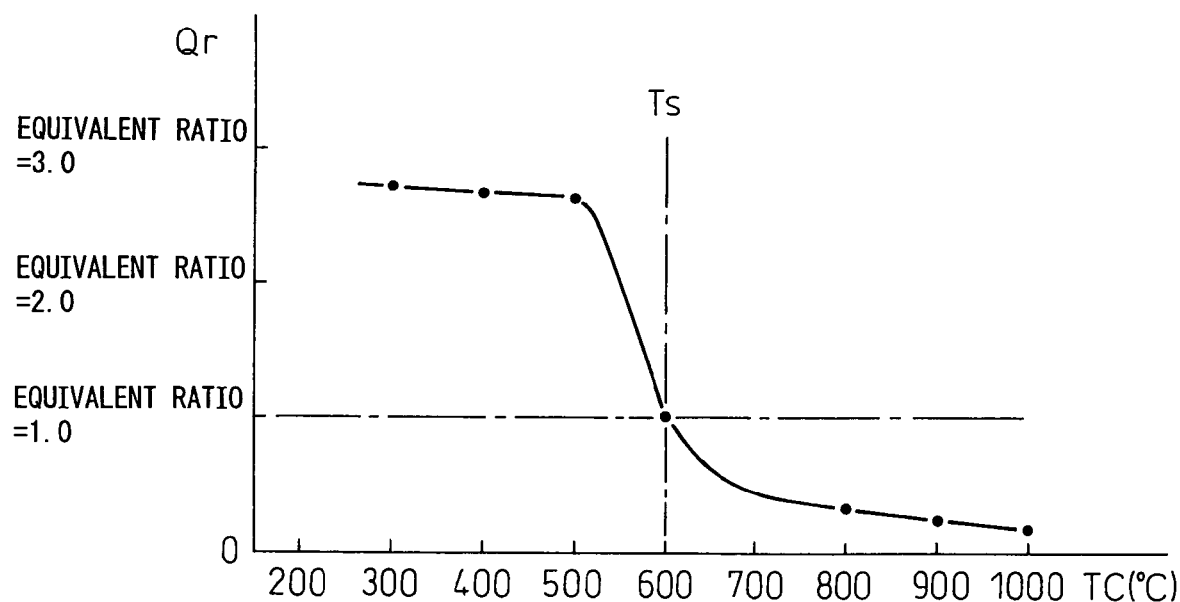
FIG. 10 is a view of the relationship between the amount of reducing agent to be supplied and the temperature of the $NO_x$ storing and decomposing catalyst.

FIG. 10 shows the relationship between the amount Qr of reducing agent expressed by the equivalent ratio required when making the air-fuel ratio rich to restore the purification performance of the $NO_x$ storing and decomposing catalyst 20 and the temperature TC of the $NO_x$ storing and decomposing catalyst 20. Note that here the amount of the reducing agent necessary for reducing the nitrogen monoxide NO produced in the interval from making the air-fuel ratio in the combustion chamber 5 or the air-fuel ratio of the exhaust gas rich once to when the air-fuel ratio in the combustion chamber 5 or the air-fuel ratio of the exhaust gas is again made rich when trying to reduce the nitrogen monoxide NO by a reducing agent is called the amount Qr of reducing agent where the equivalent ratio of the reducing agent/NO is 1. In other words, when assuming that all of the nitrogen monoxide NO in the exhaust gas is stored in the form of nitrate ions $NO_3^-$ in the $NO_x$ storing and decomposing catalyst 20, the amount Qr of the reducing agent necessary for reducing the stored nitrate ions $NO_3^-$ stoichiometrically is called the amount of reducing agent where the equivalent ratio =1.

From FIG. 10, it will be understood that when the temperature TC of the $NO_x$ storing and decomposing catalyst 20 is higher than the reference temperature Ts, the equivalent ratio of the amount of reducing agent becomes smaller than 1.0. In other words, the amount Qr of reducing agent when making the air-fuel ratio in the combustion chamber 5 or the air-fuel ratio of the exhaust gas rich for purging the oxygen ions $O^-$ held on the $NO_x$ storing and decomposing catalyst 20 when the temperature TC of the $NO_x$ storing and decomposing catalyst 20 is higher than the reference temperature Ts is smaller than the amount of the reducing agent necessary for reducing the nitrogen monoxide NO produced in the interval from when the air-fuel ratio in the combustion chamber 5 or the air-fuel ratio of the exhaust gas is made rich the previous time to when the air-fuel ratio in the combustion chamber 5 or the air-fuel ratio of the exhaust gas is made rich the current time, that is, the amount of the reducing agent with an equivalent ratio of 1.0.

In this embodiment of the present invention, it is possible to purify the $NO_x$ up until the temperature TC of the $NO_x$ storing and decomposing catalyst 20 becomes a high temperature of about 1000° C. It is possible to restore the purification performance of the $NO_x$ storing and decomposing catalyst 20 if supplying a reducing agent with an equivalent ratio of 1.0 or less when the temperature TC of the $NO_x$ storing and decomposing catalyst 20 is up to a high temperature of 1000° C. or so. That is, by supplying an amount of reducing agent smaller than the amount necessary for reducing the nitrogen monoxide NO fed into the $NO_x$ storing and decomposing catalyst 20, it is possible to restore the $NO_x$ purification performance of the $NO_x$ storing and decomposing catalyst 20, therefore it is possible to reduce the amount of fuel consumed for restoring the $NO_x$ purification performance.

Incidentally, as will be understood from FIG. 10, the amount Qr of the reducing agent to be supplied when making the air-fuel ratio rich is required to be only about one-third of the amount of the reducing agent necessary for reducing the nitrogen monoxide NO contained in the exhaust gas flowing into the $NO_x$ storing and decomposing catalyst 20, that is, the amount of the reducing agent with an equivalent ratio of 1.0, when the temperature TC of the $NO_x$ storing and decomposing catalyst 20 is about 800° C., only about one-quarter of the amount of the reducing agent necessary for reducing the nitrogen monoxide NO contained in the exhaust gas flowing into the $NO_x$ storing and decomposing catalyst 20 when the temperature TC of the $NO_x$ storing and decomposing catalyst 20 is about 900° C., and only about one-sixth of the amount of the reducing agent necessary for reducing the nitrogen monoxide NO contained in the exhaust gas flowing into the $NO_x$ storing and decomposing catalyst 20 when the temperature TC of the $NO_x$ storing and decomposing catalyst 20 is about 1000° C. That is, from FIG. 8 and FIG. 10, it is learned that the amount Qr of reducing agent supplied for purging the oxygen ions $O^-$ held on the $NO_x$ storing and decomposing catalyst 20 is reduced the higher the temperature TC of the $NO_x$ storing and decomposing catalyst 20.

On the other hand, when the temperature TC of the $NO_x$ storing and decomposing catalyst 20 is lower than the reference temperature Ts, as shown in FIG. 9, the amount Qr of the reducing agent supplied when making the air-fuel ratio rich is made the amount of reducing agent with an equivalent ratio of 1.0 or more. That is, as explained above, even when burning fuel under a lean air-fuel ratio and the temperature TC of the $NO_x$ storing and decomposing catalyst 20 is lower than the reference temperature Ts, the $NO_x$ storing and decomposing catalyst 20 holds oxygen ions $O^-$ and nitrogen monoxide NO on it in points and further the $NO_x$ storing and decomposing catalyst 20 holds the stored oxygen. However, at this time, the nitrogen monoxide NO in the exhaust gas changes to nitrate ions $NO_3^-$ on the $NO_x$ storing and decomposing catalyst 20, therefore the $NO_x$ storing and decomposing catalyst 20 has a large amount of nitrate ions $NO_3^-$ present on it, but there are little oxygen ions $O^-$ and nitrogen monoxide NO held on the $NO_x$ storing and decomposing catalyst 20. That is, when the temperature TC of the $NO_x$ storing and decomposing catalyst 20 is lower than the reference temperature Ts, the nitrogen monoxide NO in the exhaust gas is mostly stored in the form of nitrate ions $NO_3^-$ in the $NO_x$ storing and decomposing catalyst 20. Due to this, the $NO_x$ in the exhaust gas is purified.

In this case as well, if making the air-fuel ratio rich, the nitrate ions $NO_3^-$ and nitrogen monoxide NO stored in the $NO_x$ storing and decomposing catalyst 20 are reduced. However, at this time, since the efficiency of reduction of nitrate ions $NO_3^-$ by the reducing agent is not 100 percent, to reduce the nitrate ions $NO_3^-$ stored in the $NO_x$ storing and decomposing catalyst 20, a greater amount of reducing agent is required than the amount of reducing agent necessary for reducing the nitrate ions $NO_3^-$ and nitrogen monoxide NO stored in the $NO_x$ storing and decomposing catalyst 20. Therefore, as explained above, the amount Qr of the reducing agent supplied when making the air-fuel ratio rich is made an amount of reducing agent with an equivalent ratio of 1.0 or more.

Figure 11:
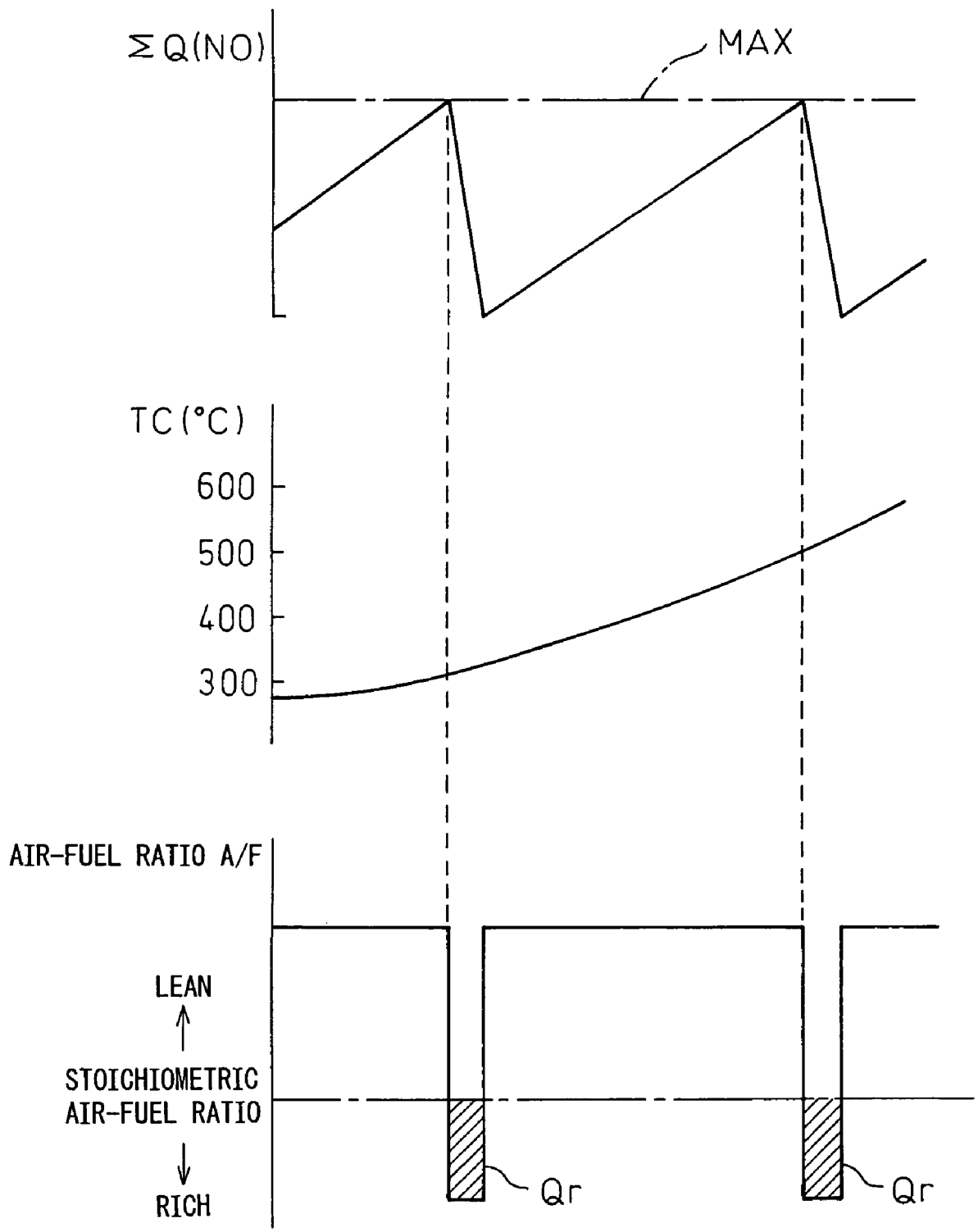
FIG. 11 is a view of the rich control of the air-fuel ratio.

When the temperature TC of the $NO_x$ storing and decomposing catalyst 20 is lower than the reference temperature Ts, the amount Q(NO) of nitrogen monoxide calculated from the map shown in FIG. 5 is cumulatively added. As shown in FIG. 11, when this cumulative amount ΣQ(NO) exceeds the allowable amount MAX, the air-fuel ratio A/F is temporarily made rich. Due to this, the purification performance of the $NO_x$ storing and decomposing catalyst 20 is restored. Comparing FIG. 11 and FIG. 8, it is learned that the amount Qr of reducing agent at this time is far greater than the case shown in FIG. 8. Further, it is learned that the amount Qr of the reducing agent at this time does not depend on the temperature TC of the $NO_x$ storing and decomposing catalyst 20.

Figure 12:
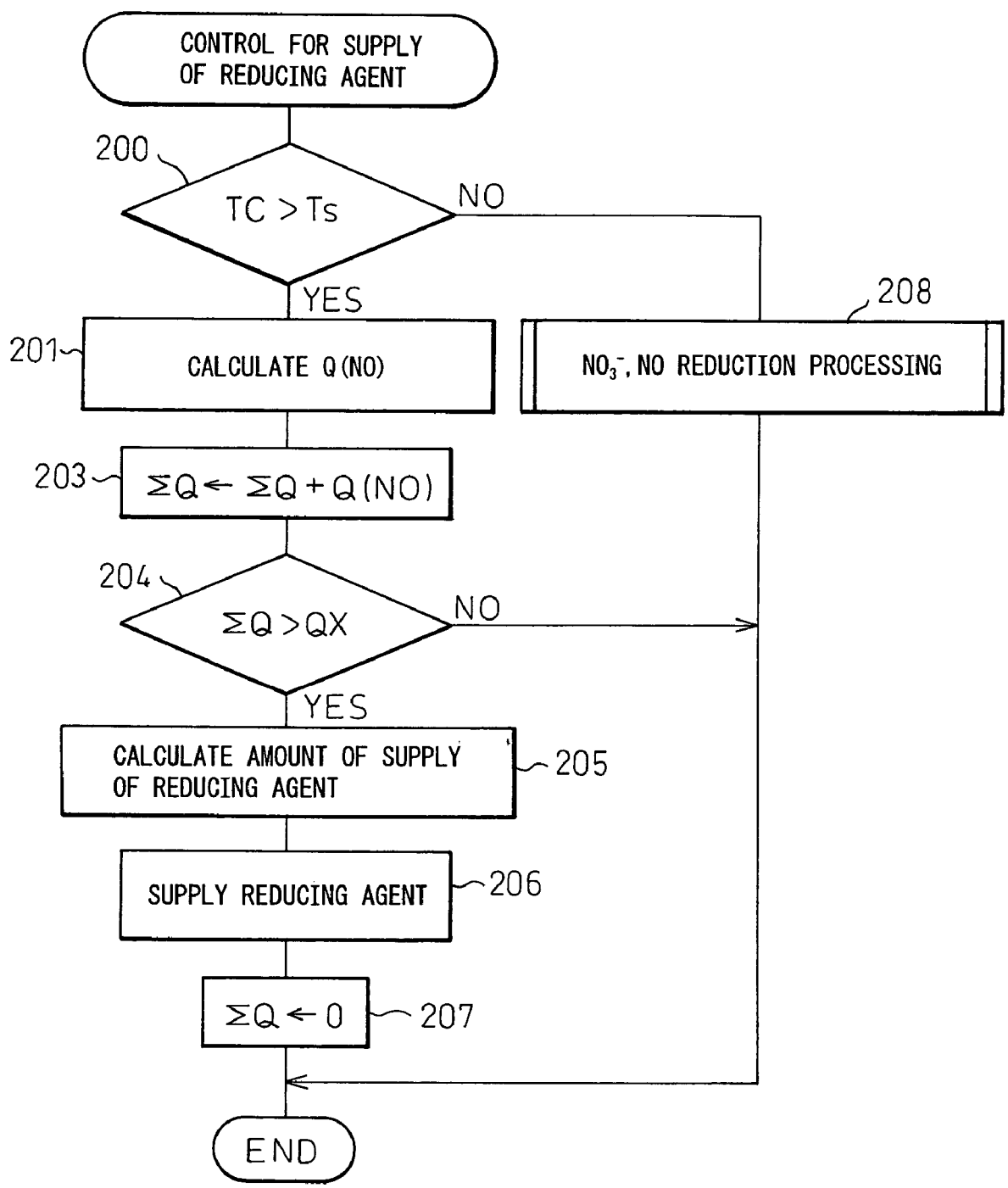
FIG. 12 is a flow chart of control of the supply of the reducing agent.

FIG. 12 shows a routine for control of the supply of the reducing agent.

Referring to FIG. 12, first at step 200, it is judged if the temperature TC of the $NO_x$ storing and decomposing catalyst 20 is higher than the reference temperature Ts. When TC>Ts, the routine proceeds to step 201, where the oxygen held in the $NO_x$ storing and decomposing catalyst 20 is purged. That is, at step 201, the amount Q(NO) of nitrogen monoxide is calculated from the map shown in FIG. 5. Next, at step 203, ΣQ is incremented by Q(NO) to calculate the cumulative amount ΣQ. Next, at step 204, it is judged if the cumulative amount ΣQ exceeds the set amount QX. When ΣQ>QX, the routine proceeds to step 205, where the amount of reducing agent to be supplied is calculated. Next, at step 206, the reducing agent is supplied to make the air-fuel ratio rich. Next, at step 207, ΣQ is cleared.

Figure 13:
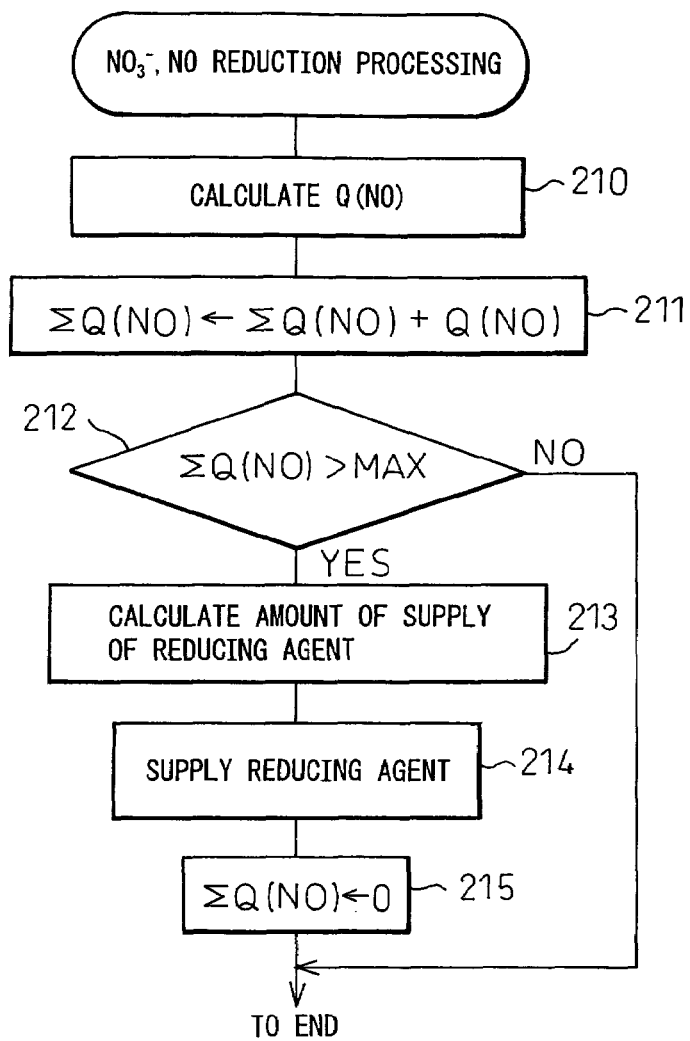
FIG. 13 is a flow chart of processing for reducing the nitrate ions and nitrogen monoxide.

On the other hand, when it is judged at step 200 that TC≦Ts, the routine proceeds to step 208, where the nitrate ions $NO_3^-$ and nitrogen monoxide NO stored in the $NO_x$ storing and decomposing catalyst 20 are reduced by NO reduction processing. This NO reduction processing is shown in FIG. 13. Referring to FIG. 13, first at step 210, the amount Q(NO) of nitrogen monoxide is cumulatively added from the map shown in FIG. 5. Next, at step 211, ΣQ(NO) is incremented by Q(NO) so as to calculate the cumulative amount ΣQ(NO). Next, at step 212, it is judged if the cumulative amount ΣQ(NO) has exceeded the allowable amount MAX. When ΣQ(NO)>MAX, the routine proceeds to step 213, where the amount of reducing agent to be supplied is calculated. Next, at step 214, the reducing agent is supplied to make the air-fuel ratio rich. Next, at step 215, ΣQ(NO) is cleared.

However, as explained above, when the temperature TC of the $NO_x$ storing and decomposing catalyst 20 is higher than the reference temperature Ts, the higher the temperature TC of the $NO_x$ storing and decomposing catalyst 20, it more possible it is to reduce the amount Qr of reducing agent when making the air-fuel ratio rich. This means that when making the amount Qr of reducing agent substantially constant, it is possible to make the time interval from when making the air-fuel ratio rich until making it rich again longer the higher the temperature TC of the $NO_x$ storing and decomposing catalyst 20.

Figure 14:
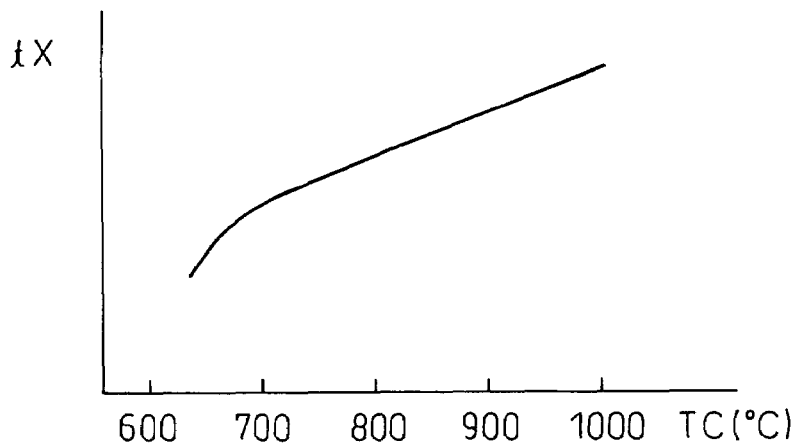
FIG. 14 is a view of the elapsed time.

Therefore, in the third embodiment of the present invention, as shown in FIG. 14, the time interval tX from when making the air-fuel ratio in the combustion chamber 5 or the air-fuel ratio of the exhaust gas rich to purge the oxygen ions $O^-$ stored in the $NO_x$ storing and decomposing catalyst 20 to when next making the air-fuel ratio in the combustion chamber 5 or the air-fuel ratio of the exhaust gas rich is increased the higher the temperature TC of the $NO_x$ storing and decomposing catalyst 20.

Figure 15:
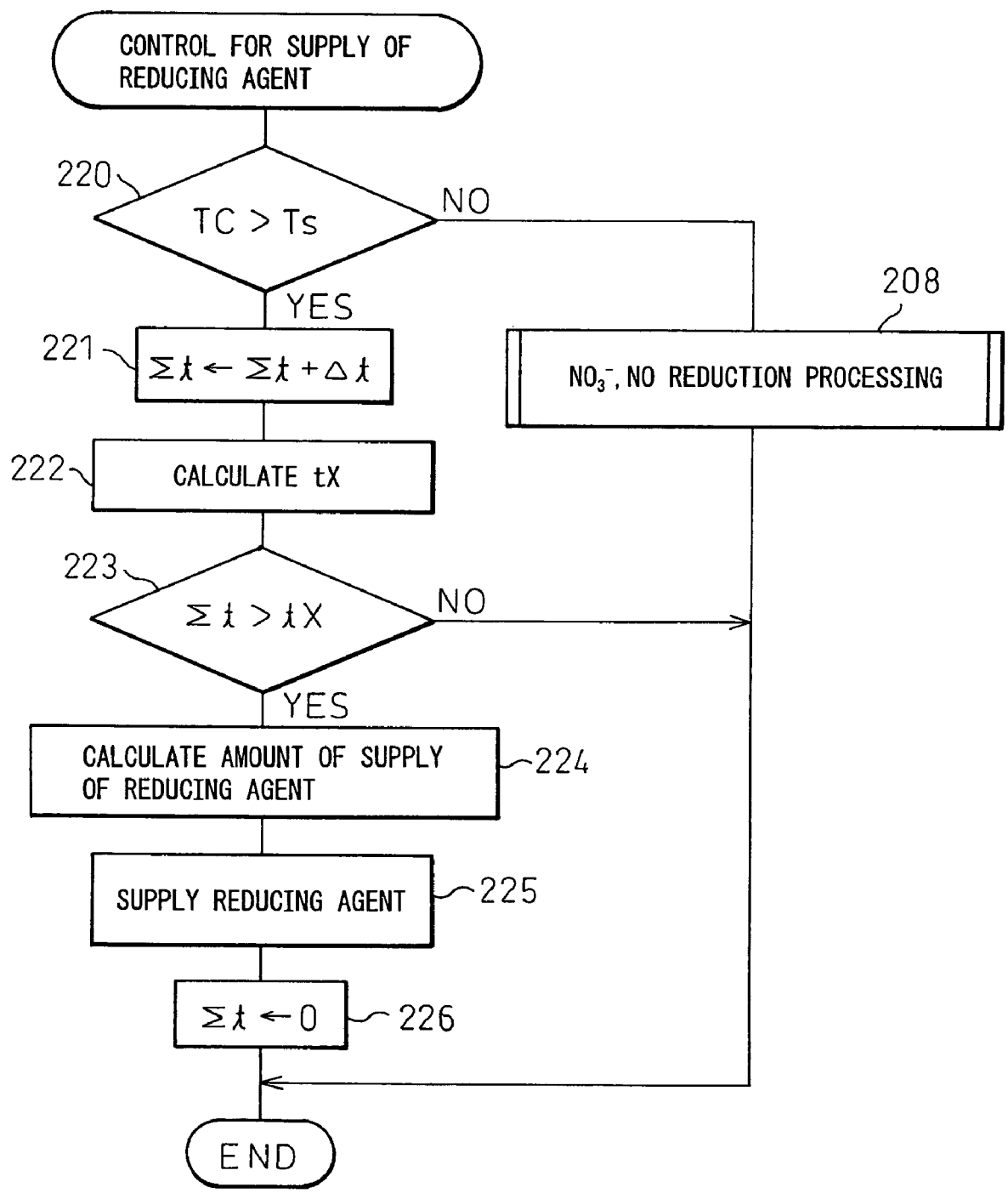
FIG. 15 is a flow chart of control of the supply of the reducing agent.

FIG. 15 shows a routine for control of the supply of the reducing agent for working this third embodiment.

Referring to FIG. 15, first at step 220, it is judged if the temperature TC of the $NO_x$ storing and decomposing catalyst 20 is higher than a reference temperature Ts. When TC>Ts, the routine proceeds to step 221, where the time Δt from the previous processing cycle to the current processing cycle is added to the time Σt. Due to this, the elapsed time Σt is calculated. Next, at step 222, the elapsed time tX to be targeted is calculated from FIG. 13. Next, at step 223, it is judged if the elapsed time Σt has exceeded the target elapsed time tX. When Σt>tX, the routine proceeds to step 224, where the amount of reducing agent to be supplied is calculated. Next, at step 225, the reducing agent is supplied to make the air-fuel ratio rich, then at step 226, Σt is cleared.

On the other hand, when it is judged at step 220 that TC≦Ts, the routine proceeds to step 208, where the processing for reducing NO shown in FIG. 13 is executed.

Figure 16:
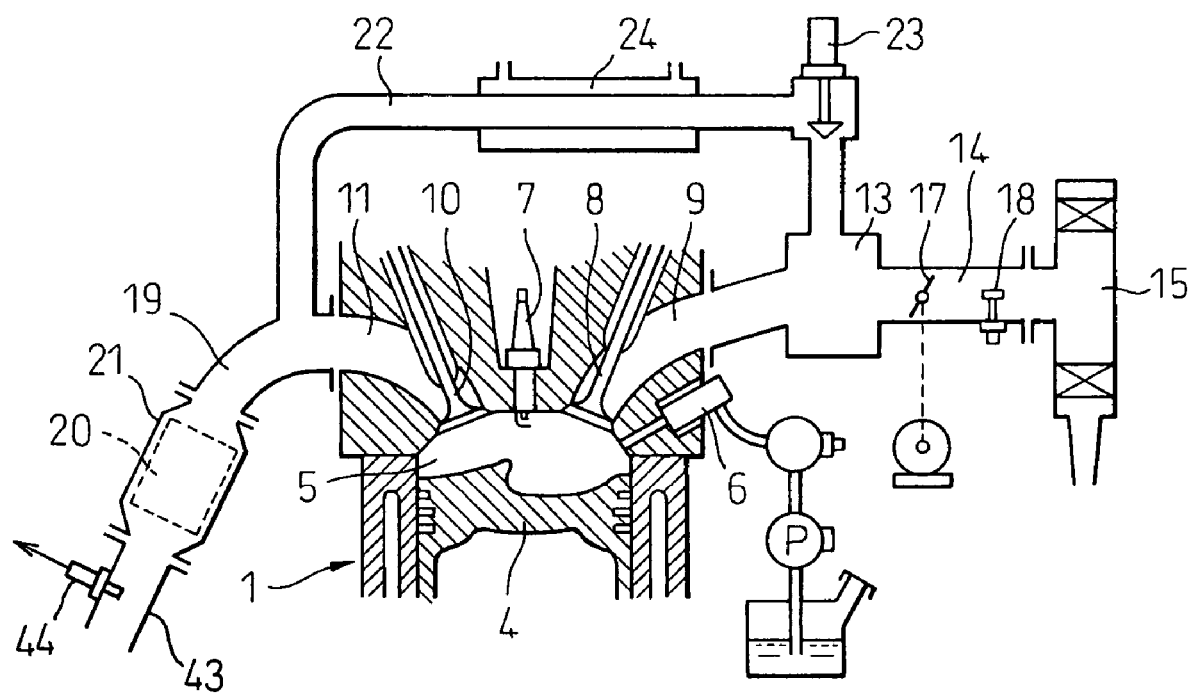
FIG. 16 is an overview of another embodiment of a spark ignition type internal combustion engine.

FIG. 16 shows a fourth embodiment. As shown in FIG. 16, in this embodiment, the part of the exhaust pipe 43 downstream of the $NO_x$ storing and decomposing catalyst 20 is provided inside it with a $NO_x$ concentration sensor 44 for detecting the $NO_x$ concentration in the exhaust gas passing through the $NO_x$ storing and decomposing catalyst 20.

While the ultrastrong basic points of the $NO_x$ storing and decomposing catalyst 20 are not buried by oxygen ions $O^-$, the $NO_x$ contained in the exhaust gas is trapped by the $NO_x$ storing and decomposing catalyst 20, so the exhaust gas flowing out from the $NO_x$ storing and decomposing catalyst 20 does not contain much $NO_x$ at all. However, when a considerable part of the ultrastrong basic points of the $NO_x$ storing and decomposing catalyst 20 is buried by oxygen ions $O^-$, the amount of $NO_x$ passing straight through the $NO_x$ storing and decomposing catalyst 20 without being trapped by the $NO_x$ storing and decomposing catalyst 20 gradually increases. Therefore, in this fourth embodiment, when the $NO_x$ concentration in the exhaust gas flowing out from the $NO_x$ storing and decomposing catalyst 20 exceeds an allowable value, it is judged that a considerable part of the ultrastrong basic points has been buried by oxygen ions $O^-$ and the air-fuel ratio of the exhaust gas flowing into the $NO_x$ storing and decomposing catalyst 20 is changed from lean to rich in a spike.

Figure 17:
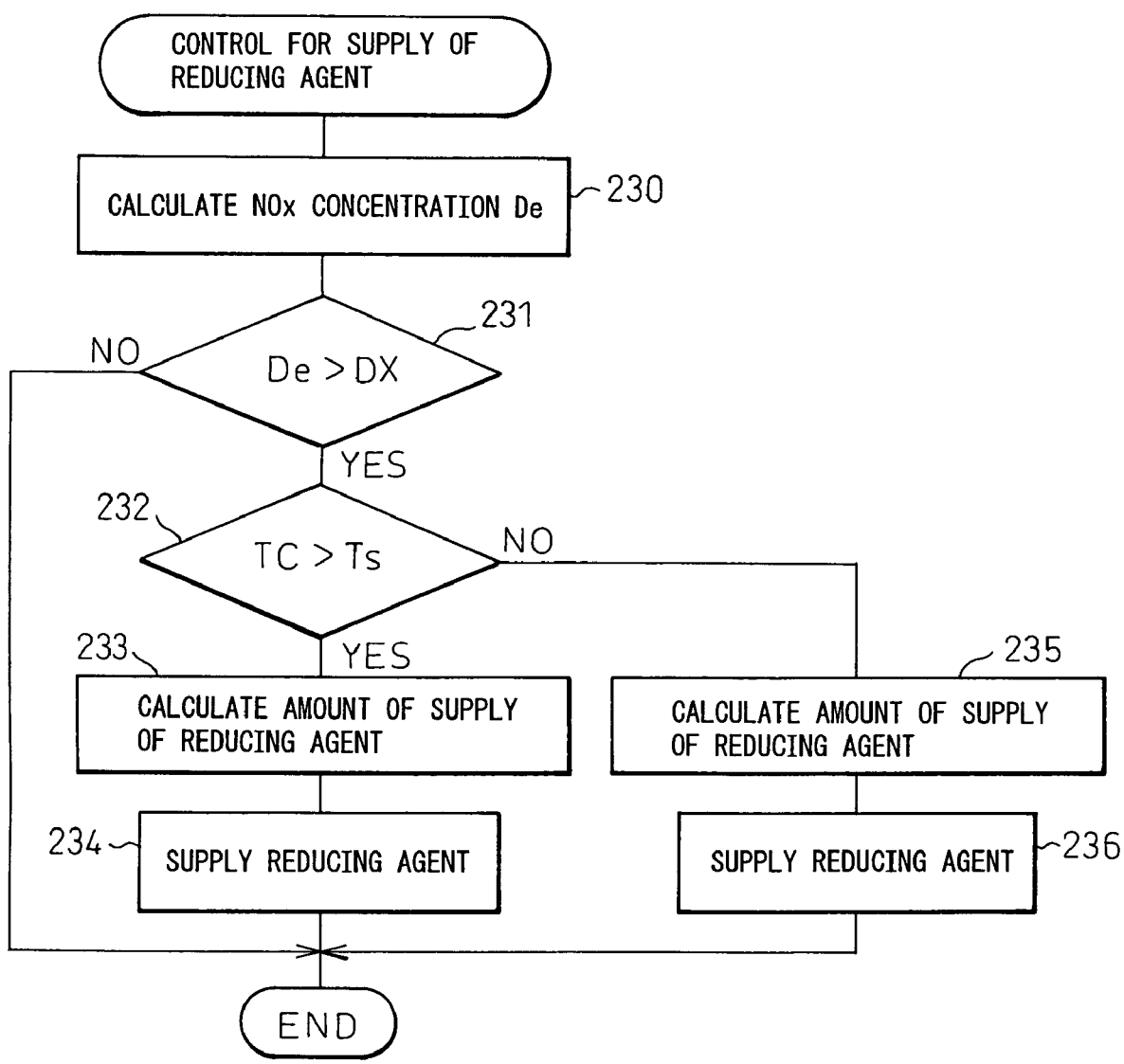
FIG. 17 is a flow chart for control of the supply of the reducing agent.

FIG. 17 shows the routine for control of the supply of the reducing agent for working this fourth embodiment.

Referring to FIG. 17, first at step 230, the $NO_x$ concentration De in the exhaust gas flowing out from the $NO_x$ storing and decomposing catalyst 20 is detected by the $NO_x$ concentration sensor 44. Next, at step 231, it is judged if the $NO_x$ concentration De detected by the $NO_x$ concentration sensor 44 has become larger than the allowable value DX. When De≦DX, the processing cycle ends. As opposed to this, when De>DX, the routine proceeds to step 232, it is judged if the temperature TC of the $NO_x$ storing and decomposing catalyst 20 is higher than the reference temperature Ts. When TC>Ts, the routine proceeds to step 233, where the amount of reducing agent to be supplied is calculated. Next, at step 234, the reducing agent is supplied to make the air-fuel ratio rich. At this time, the amount of the reducing agent supplied is smaller than an equivalent ratio=1.

On the other hand, when it is judged at step 232 that TC≦Ts, the routine proceeds to step 235, where the amount of reducing agent to be supplied is calculated. Next, at step 236, the reducing agent is supplied to make the air-fuel ratio rich. At this time, the amount of the reducing agent supplied is greater than the equivalent ratio=1.

Figure 18:
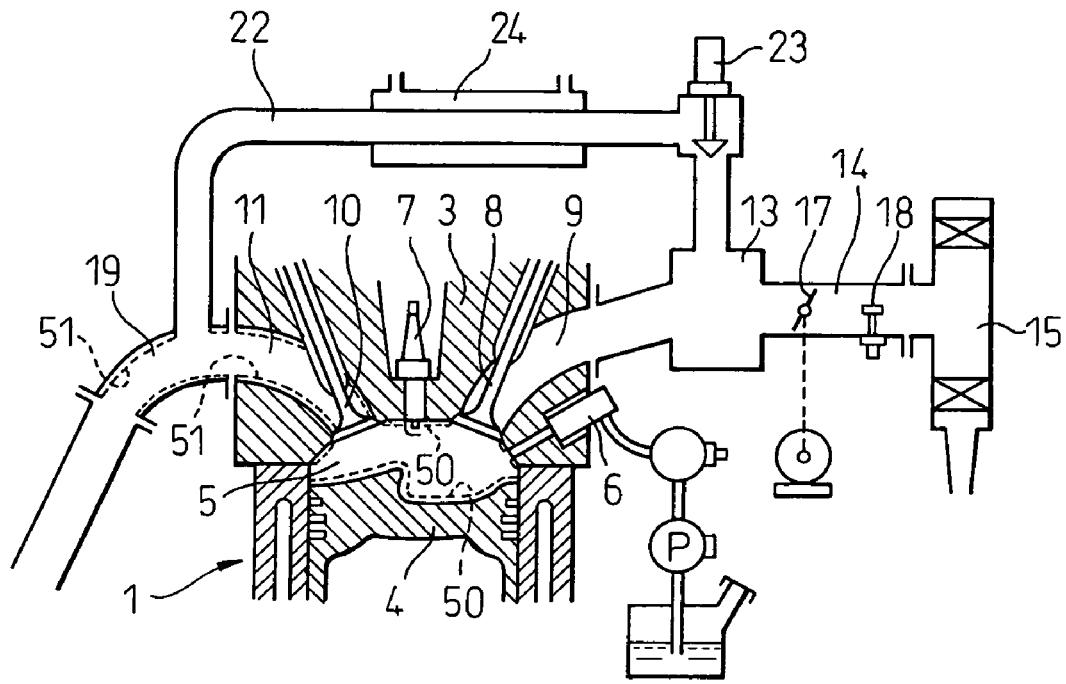
FIG. 18 is an overview of still another embodiment of a spark ignition type internal combustion engine.

FIG. 18 shows still another embodiment. In this embodiment, as shown by the broken line, the $NO_x$ storing and decomposing catalyst 50 is carried at the inside walls of the combustion chamber 5 such as the inside walls of the cylinder head 3 and top face of the piston 4, or the $NO_x$ storing and decomposing catalyst 51 is carried on the inside walls of the exhaust passage such as the inside walls of the exhaust port 11 and inside walls of the exhaust manifold 19. When the $NO_x$ storing and decomposing catalyst 50 is carried on the inside walls of the combustion chamber 5, the combustion gas or burned gas in the combustion chamber 5 contacts the $NO_x$ storing and decomposing catalyst 50 whereupon the nitrogen oxide contained in these combustion gas or burned gas, mainly nitrogen monoxide NO, is adsorbed at the $NO_x$ storing and decomposing catalyst 50, then disassociated to nitrogen N and oxygen O. When the $NO_x$ storing and decomposing catalyst 51 is carried on the inside walls of the exhaust passage, the exhaust gas exhausted from the combustion chamber 5 contacts the $NO_x$ storing and decomposing catalyst 51, whereupon the nitrogen monoxide NO contained in this exhaust gas is adsorbed at the $NO_x$ storing and decomposing catalyst 51, then is disassociated to nitrogen N and oxygen O.

Figure 19:
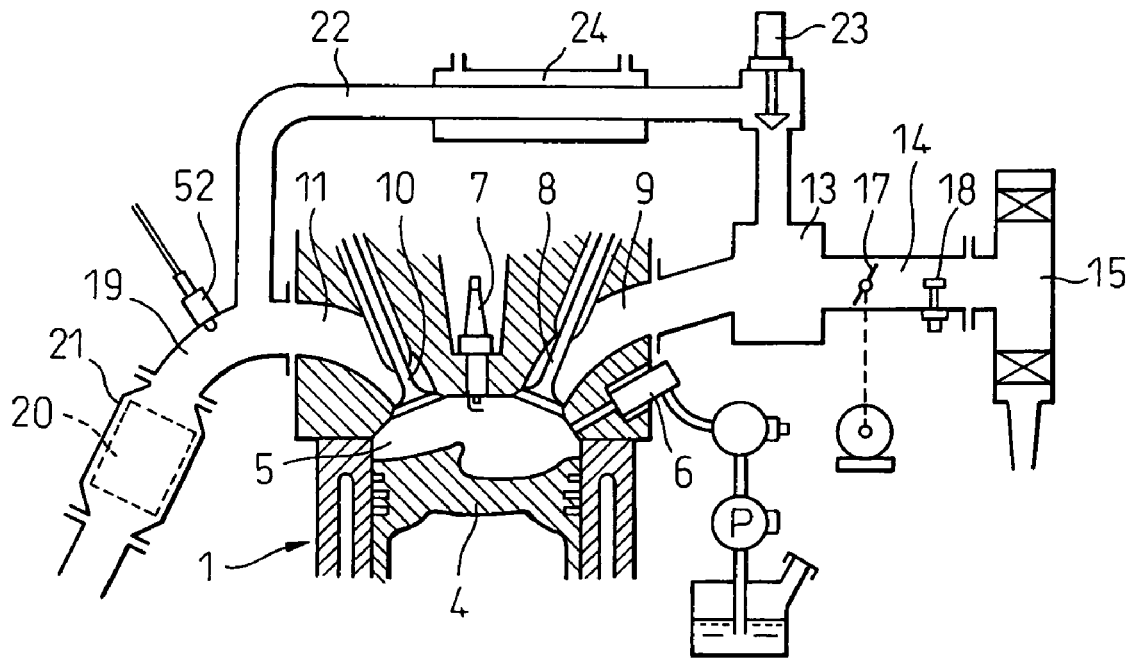
FIG. 19 is an overview of still another embodiment of a spark ignition type internal combustion engine.

In the embodiment shown in FIG. 19, the exhaust manifold 19 upstream of the $NO_x$ storing and decomposing catalyst 20 is provided inside it with a reducing agent feed valve 52. When the air-fuel ratio of the exhaust gas should be made rich, this reducing agent feed valve 52 supplies a reducing agent inside the exhaust gas.

Figure 20:
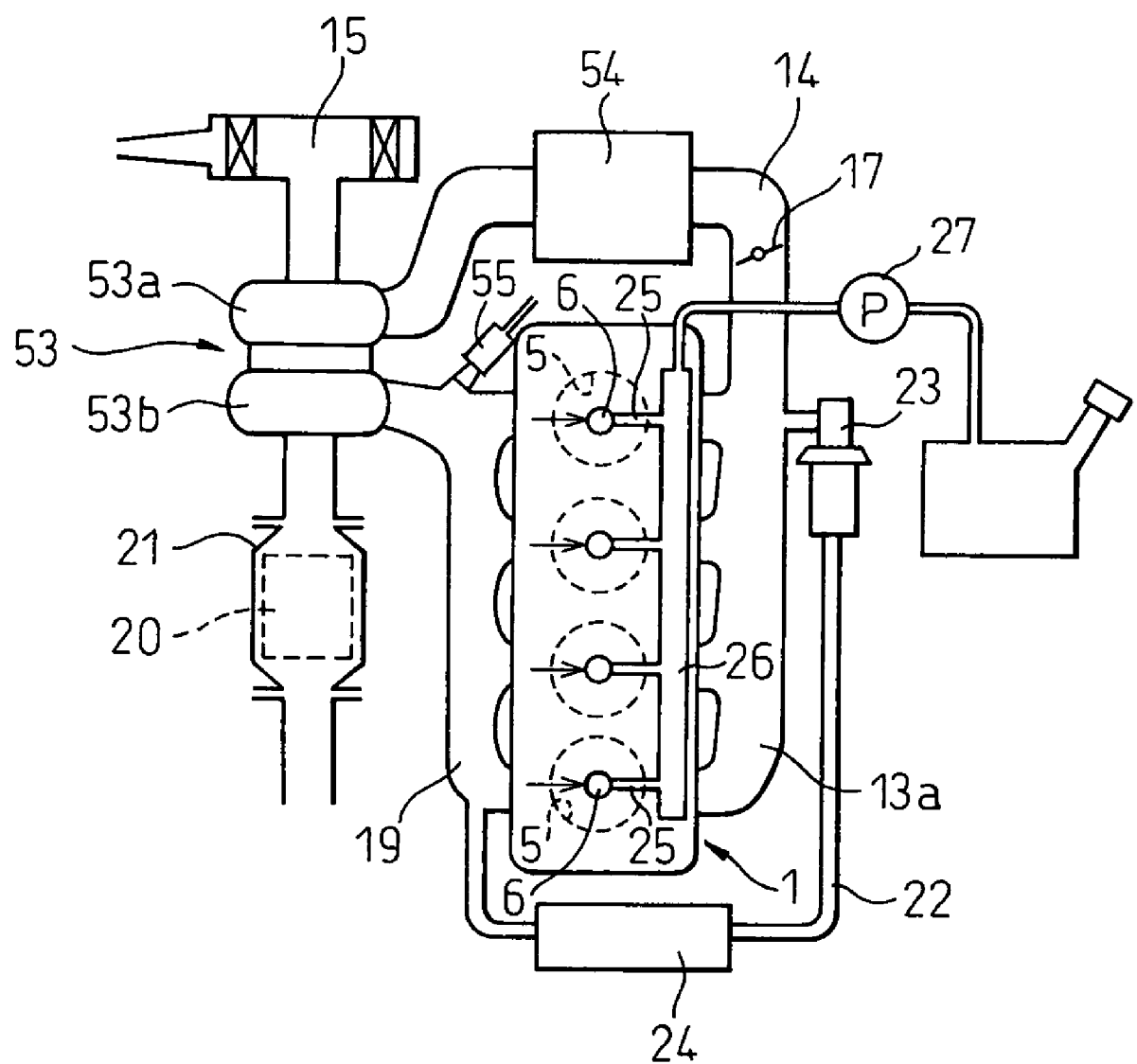
FIG. 20 is an overview of a compression ignition type internal combustion engine.

FIG. 20 shows the case of application of the present invention to a compression ignition type internal combustion engine. Note that in FIG. 20, parts similar to those of the spark ignition type internal combustion engine shown in FIG. 1 are shown by the same reference numerals. In FIG. 20, 1 indicates an engine body, 5 a combustion chamber of each cylinder, 6 an electrical control type fuel injector for injecting fuel into each combustion chamber 5, 13a an intake manifold, and 19 an exhaust manifold. The intake manifold 13a is connected through the intake duct 14 to the outlet of the compressor 53a of the exhaust turbocharger 53, while the inlet of the compressor 53a is connected to the air cleaner 15. The intake duct 14 is provided inside it with a throttle valve 17. Further, the intake duct 14 is provided around it with a cooling device 54 for cooling the intake air flowing through the intake duct 14. On the other hand, the exhaust manifold 19 is connected with the inlet of an exhaust turbine 53b of the exhaust turbocharger 53, while the outlet of the exhaust turbine 53b is connected to a catalytic converter 21 housing the $NO_x$ storing and decomposing catalyst 20. The outlet of the collecting portion of the exhaust manifold 19 is provided with a reducing agent feed valve 55 for supplying a reducing agent comprised of for example hydrocarbons for making the air-fuel ratio of the exhaust gas rich. The exhaust manifold 19 and the intake manifold 13a are connected with each other via an EGR passage 22. The EGR passage 22 is provided inside it with an electrical control type EGR control valve 23. Further, the EGR passage 22 is provided around it with a cooling device 24 for cooling the EGR gas flowing through the inside of the EGR passage 22. On the other hand, each fuel injector 6 is connected through a fuel supply pipe 25 to a common rail 26. This common rail 26 is supplied with fuel from an electrical control type variable discharge fuel pump 27.

In this compression ignition type internal combustion engine, fuel is burned continuously under a lean air-fuel ratio. When restoring the purification performance of the $NO_x$ storing and decomposing catalyst 20 by periodically making the air-fuel ratio of the exhaust gas rich in a spike, the reducing agent feed valve 55 supplies the reducing agent into the exhaust gas.

Note that in this compression ignition type internal combustion engine as well, when the temperature TC of the $NO_x$ storing and decomposing catalyst 20 is higher than the reference temperature Ts determined by the $NO_x$ storing and decomposing catalyst 20, the amount of the periodically supplied reducing agent is made smaller than the amount of the reducing agent necessary for reducing the $NO_x$ flowing into the $NO_x$ storing and decomposing catalyst 20 in the interval from when the reducing agent is supplied the previous time to when the reducing agent is supplied the current time. When the temperature TC of the $NO_x$ storing and decomposing catalyst 20 is lower than a reference temperature Ts determined by the $NO_x$ storing and decomposing catalyst 20, the amount of the periodically supplied reducing agent is made larger than the amount of the reducing agent necessary for reducing the $NO_x$ flowing into the $NO_x$ storing and decomposing catalyst 20 in the interval from when the reducing agent is supplied the previous time to when the reducing agent is supplied the current time.

Next, an embodiment shown in FIG. 20 where the $NO_x$ storing and decomposing catalyst 20 is replaced with a particulate filter and this particulate filter is formed with a layer of a $NO_x$ storing and decomposing catalyst will be explained.

Figure 21A:
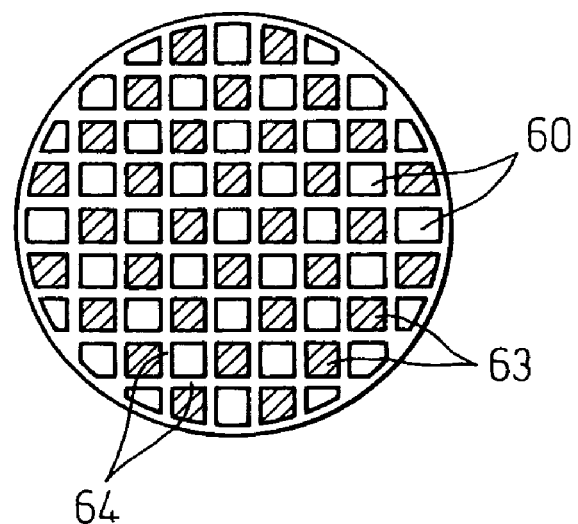
FIGS. 21A and 21B are views of a particulate filter.
Figure 21B:
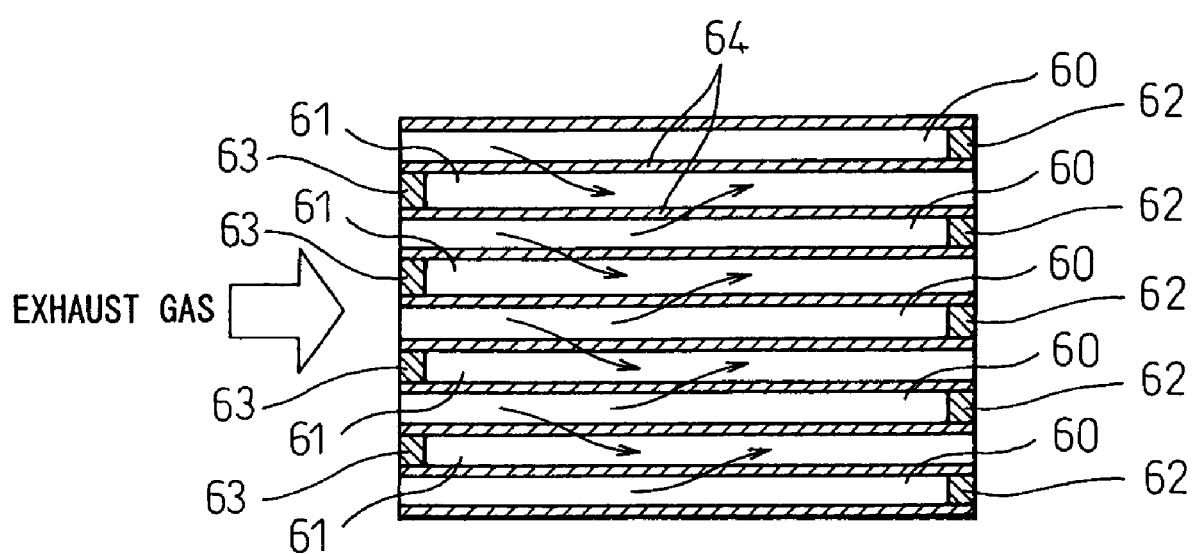

FIG. 21A and 21B show the structure of this particulate filter. Note that FIG. 21A is a front view of a particulate filter, and FIG. 21B is a side sectional view of a particulate filter. As shown in FIG. 21A and 21B, the particulate filter forms a honeycomb structure and is provided with a plurality of exhaust flow passages 60 and 61 extending in parallel with each other. These exhaust flow passages are comprised of exhaust gas inflow passages 60 with downstream ends closed by plugs 62 and exhaust gas outflow passages 61 with upstream ends closed by plugs 63. Note that in FIG. 21A, the hatched portions indicate plugs 63. Therefore, the exhaust gas inflow passages 60 and exhaust gas outflow passages 61 are alternately arranged via thin partitions 64. In other words, the exhaust gas inflow passages 60 and exhaust gas outflow passages 61 are arranged so that each exhaust gas inflow passage 60 is surrounded by four exhaust gas outflow passages 61 and so that each exhaust gas outflow passage 61 is surrounded by four exhaust gas inflow passages 60.

The particulate filter is formed from a porous material such as for example cordierite. Therefore, the exhaust gas flowing into the exhaust gas inflow passages 60, as shown by the arrows in FIG. 21B, passes through the surrounding partitions 64 and flows out into the neighboring exhaust gas outflow passages 61. In this embodiment, the peripheral walls of the exhaust gas inflow passages 60 and exhaust gas outflow passages 61, that is, the two side surfaces of the partitions 64 and the inside walls of the holes in the partitions 64, are formed with a layer of a $NO_x$ storing and decomposing catalyst.

In this embodiment as well, when restoring the $NO_x$ purification performance of the $NO_x$ storing and decomposing catalyst, the air-fuel ratio of the exhaust gas is made rich. Further, in this embodiment, the particulate contained in the exhaust gas is trapped by the particulate filter, and the trapped particulate is successively burned by the heat of the exhaust gas. When a large amount of particulate deposits on the particulate filter, a reducing agent is supplied and the exhaust gas temperature is raised. Due to this, the deposited particulate is ignited and burned.

Next, a low temperature combustion method suitable for restoring the $NO_x$ purification performance of a $NO_x$ storing and decomposing catalyst in a compression ignition type internal combustion engine by making the air-fuel ratio in the combustion chamber rich will be explained.

Figure 22:
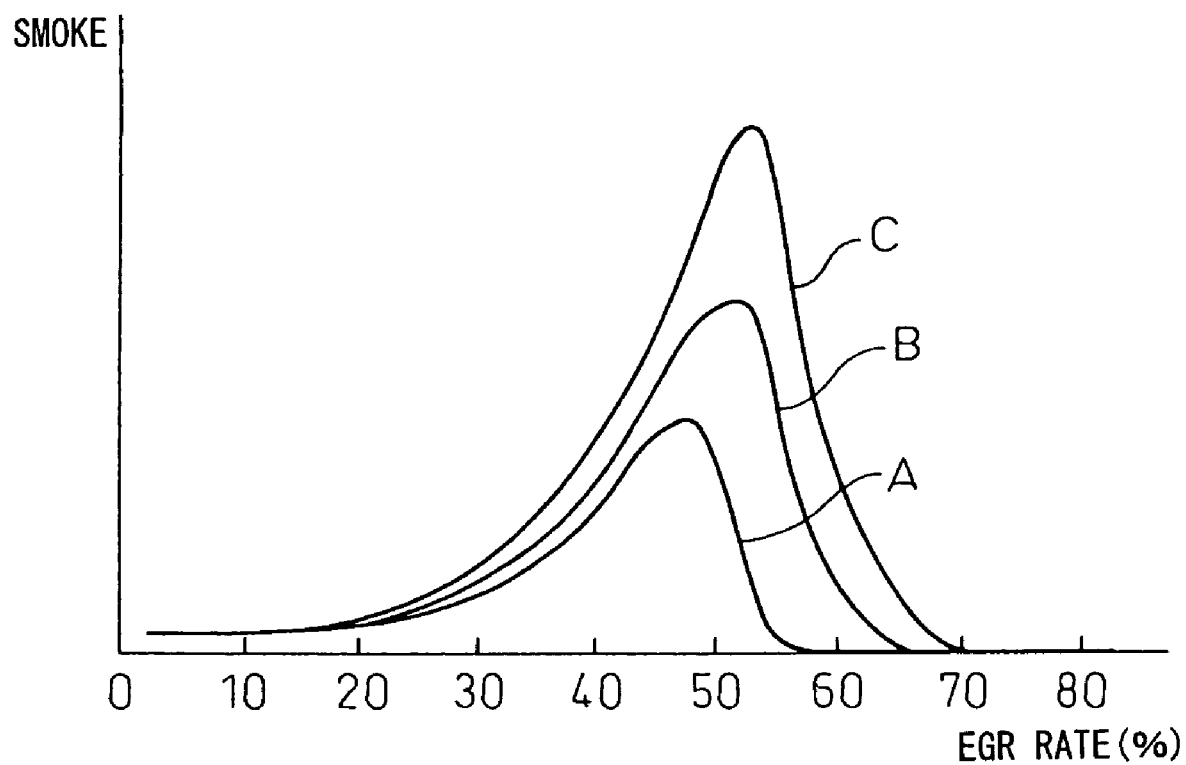
FIG. 22 is a view of the amount of generation of smoke.

In the compression ignition type internal combustion engine shown in FIG. 20, if increasing the EGR rate (amount of EGR gas/(amount of EGR gas+amount of intake air)), the amount of generation of smoke gradually increases and peaks. When further raising the EGR rate, the amount of generation of smoke rapidly falls. This will be explained while referring to FIG. 22 showing the relationship between the EGR rate and smoke when changing the cooling degree of the EGR gas. Note that in FIG. 22, the curve A shows the case of forcibly cooling the EGR gas to maintain the EGR gas temperature at substantially 90° C., the curve B shows the case of cooling the EGR gas by a small sized cooling device, and the curve C shows the case of not forcibly cooling the EGR gas.

As shown by the curve A of FIG. 22, when forcibly cooling the EGR gas, the amount of generation of smoke peaks when the EGR rate is slightly lower than 50 percent. In this case, if making the EGR rate substantially 55 percent or more, almost no smoke is generated any longer. On the other hand, as shown by the curve B of FIG. 22, when slightly cooling the EGR gas, the amount of generation of smoke peaks when the EGR rate is slightly higher than 50 percent. In this case, if making the EGR rate substantially 65 percent or more, almost no smoke is generated any longer. Further, as shown by the curve C in FIG. 22, when not forcibly cooling the EGR gas, the amount of generation of smoke peaks when the EGR rate is near 55 percent. In this case, if making the EGR rate substantially 70 percent or more, almost no smoke is generated any longer.

The reason why making the EGR gas rate 55 percent or more results in no smoke being generated any longer in this way is that the endothermic action of the EGR gas keeps the gas temperature of the fuel and its surroundings at the time of combustion from being that high, that is, low temperature combustion is performed and, as a result, hydrocarbons do not grow to soot.

This low temperature combustion has the characteristic of enabling a reduction in the amount of generation of $NO_x$ while suppressing the generation of smoke regardless of the air-fuel ratio. That is, if the air-fuel ratio is made rich, the fuel becomes in excess, but the combustion temperature is suppressed to a low temperature, so the excess fuel does not grow to soot, therefore smoke is never generated. Further, at this time, only an extremely small amount of $NO_x$ is also produced. On the other hand, when the average air-fuel ratio is lean or when the air-fuel ratio is the stoichiometric air-fuel ratio, the higher the combustion temperature, the smaller the amount of soot produced, but under low temperature combustion, the combustion temperature is suppressed to a low temperature, so no smoke is generated at all. The amount of $NO_x$ generated is only extremely small.

On the other hand, if performing this low temperature combustion, the gas temperature of the fuel and its surroundings becomes lower, but the temperature of the exhaust gas rises. This will be explained with reference to FIGS. 23A and 23B.

Figure 23A:
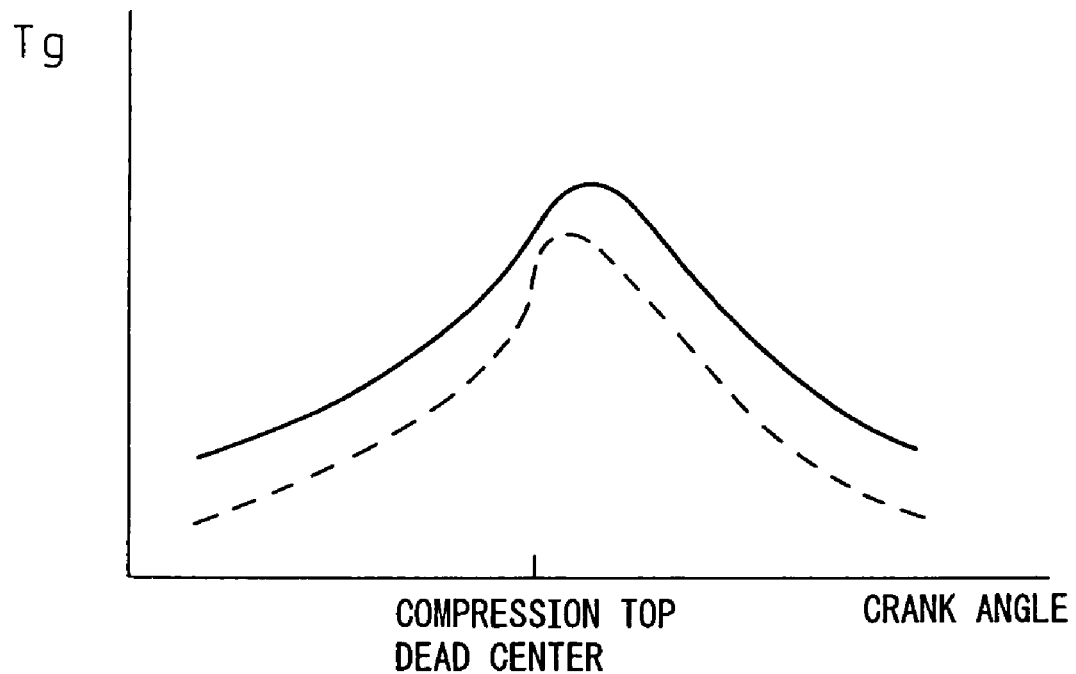
FIGS. 23A and 23B are views of the gas temperature etc. of a combustion chamber.

The solid line of FIG. 23A shows the relationship between the average gas temperature Tg in the combustion chamber 5 and the crank angle at the time of low temperature combustion, while the broken line of FIG. 23A shows the relationship between the average gas temperature Tg in the combustion chamber 5 and the crank angle at the time of ordinary combustion. Further, the solid line of FIG. 23B shows the relationship between the gas temperature Tf of the fuel and its surroundings and the crank angle at the time of low temperature combustion, and the broken line of FIG. 23B shows the relationship between the gas temperature Tf of the fuel and its surroundings and the crank angle at the time of ordinary combustion.

When low temperature combustion is being performed, the amount of EGR gas becomes greater compared with when ordinary combustion is being performed, therefore as shown in FIG. 23A, before compression top dead center, that is, during the compression stroke, the average gas temperature Tg at the time of low temperature combustion shown by the solid line becomes higher than the average gas temperature Tg at the time of ordinary combustion shown by the broken line. Note that at this time, as shown in FIG. 23B, the gas temperature Tf of the fuel and its surroundings becomes substantially the same temperature as the average gas temperature Tg.

Figure 23B:
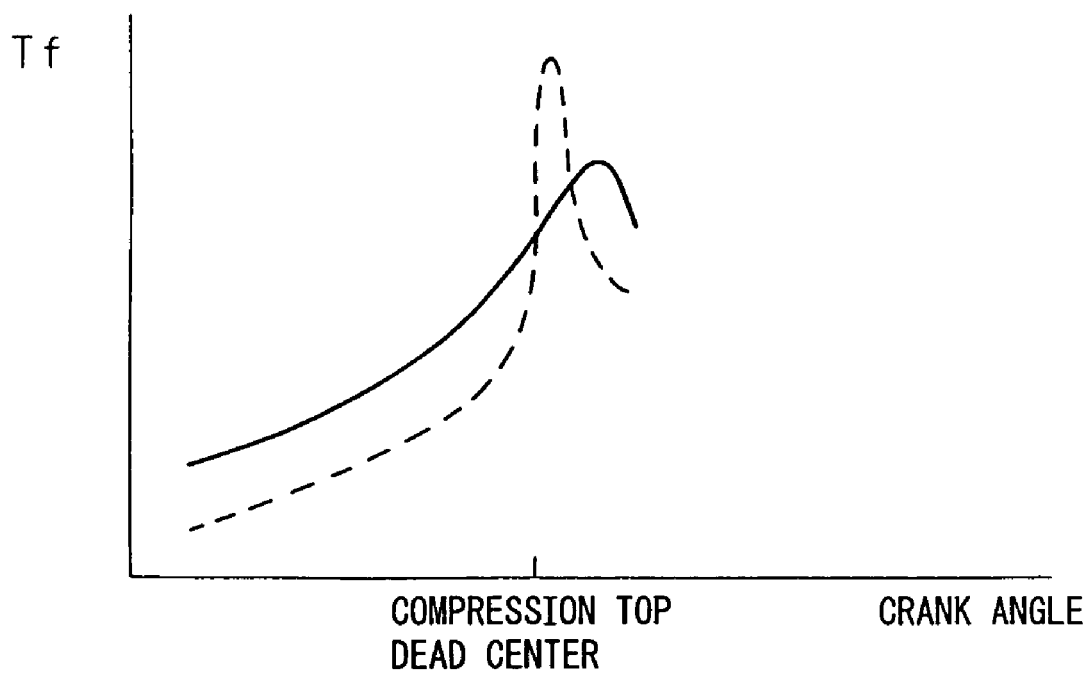

Next, combustion is started near compression top dead center, but in this case, when low temperature combustion is being performed, as shown by the solid line of FIG. 23B, due to the endothermic action of the EGR gas, the gas temperature Tf of the fuel and its surroundings does not become that high. As opposed to this, when ordinary combustion is being performed, the fuel has a large amount of oxygen present around it, so as shown by the broken line of FIG. 23B, the gas temperature Tf of the fuel and its surroundings becomes extremely high. In this way, when ordinary combustion is being performed, the gas temperature Tf of the fuel and its surroundings becomes considerably higher than when low temperature combustion is being performed, but the temperature of the other gas, accounting for the majority of the gas, becomes lower when ordinary combustion is performed compared with when low temperature combustion is being performed. Therefore, as shown in FIG. 23A, the average gas temperature Tg in the combustion chamber 5 near compression top dead center becomes higher when low temperature combustion is being performed compared with when ordinary combustion is being performed. As a result, as shown in FIG. 23A, the temperature of the burned gas in the combustion chamber 5 after combustion ends becomes higher when low temperature combustion is being performed compared with when an ordinary combustion is being performed, therefore when low temperature combustion is performed, the exhaust gas temperature becomes higher.

Figure 24:
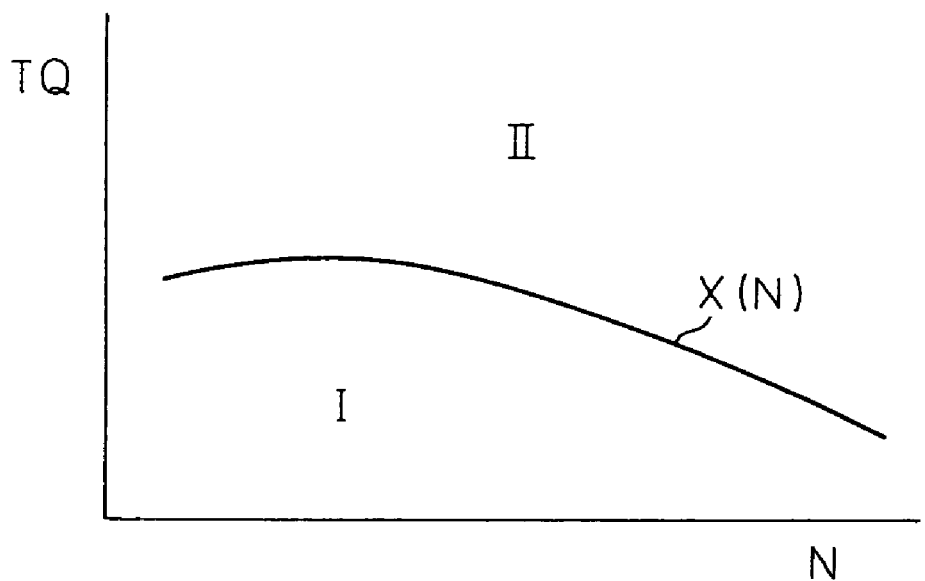
FIG. 24 is a view showing operating regions I and II.

However, when the required torque TQ of the engine becomes higher, that is, when the amount of fuel injection becomes greater, the gas temperature of the fuel and its surroundings at the time of combustion becomes higher, so low temperature combustion becomes difficult. That is, low temperature combustion can only be performed at the time of engine medium and low load operation where the amount of heat generated by combustion is relatively small. In FIG. 24, region I indicates first combustion where the amount of inert gas of the combustion chamber 5 is greater than the amount of inert gas where the amount of generation of soot peaks. That is, it shows the operating region where low temperature combustion can be performed. Region II indicates second combustion where the amount of inert gas in the combustion chamber is smaller than the amount of inert gas where the amount of generation of soot peaks. That is, it shows the operating region where only ordinary combustion can be performed.

Figure 25:
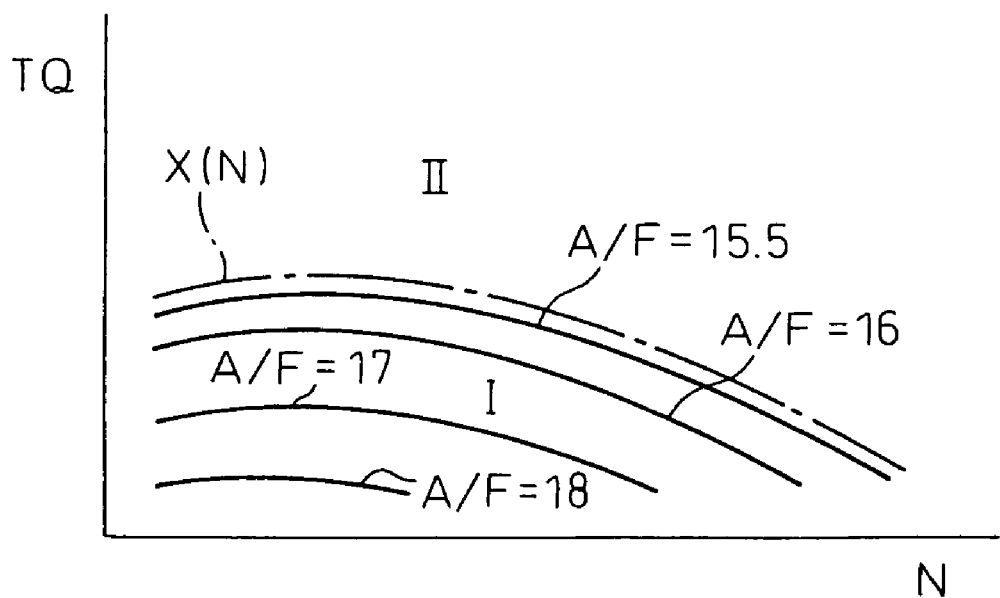
FIG. 25 is a view of the air-fuel ratio A/F.
Figure 26:
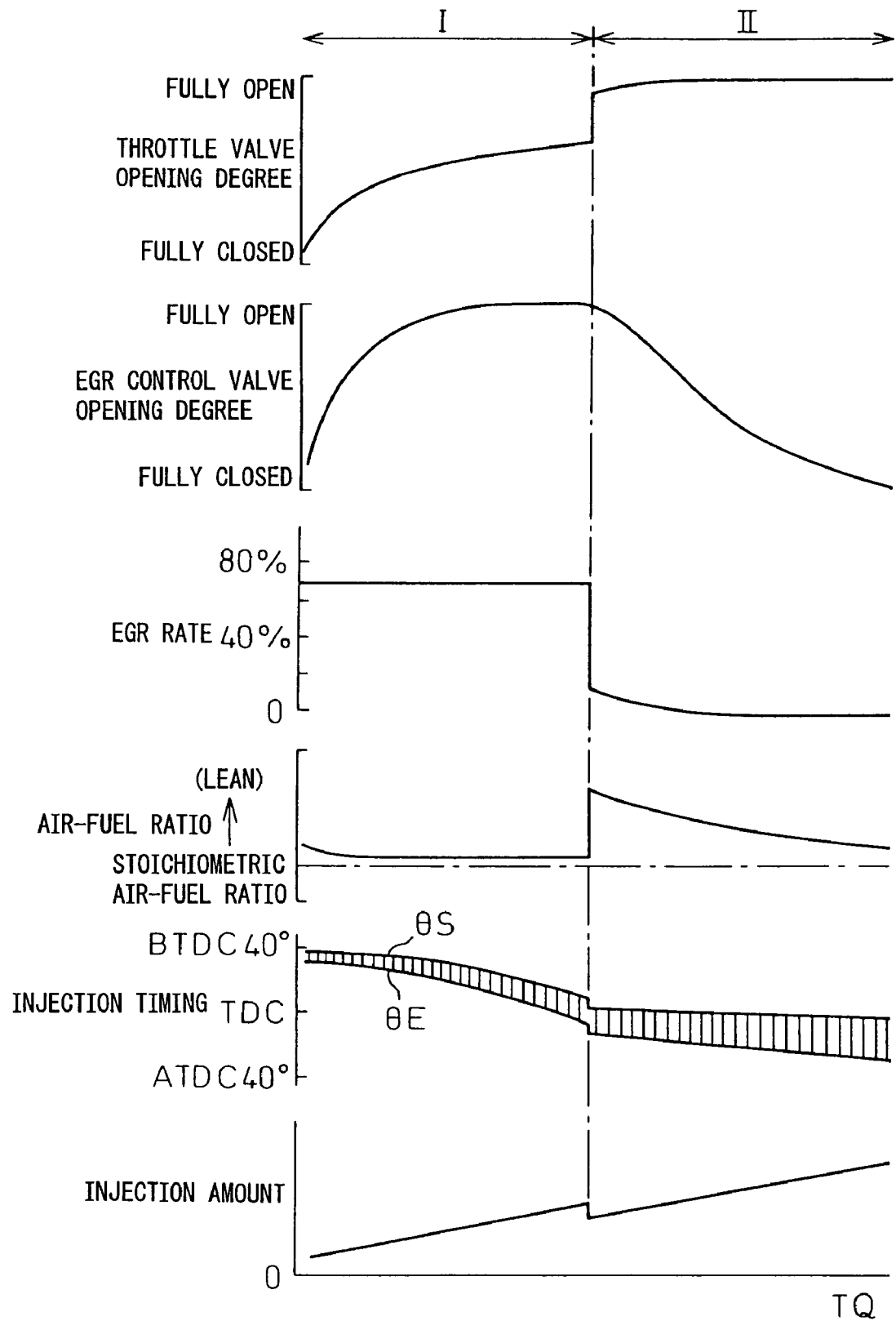
FIG. 26 is a view of the change of the throttle valve opening degree etc.

FIG. 25 shows the target air-fuel ratio A/F in the case of low temperature combustion in the operating region I, while FIG. 26 shows the opening degree of the throttle valve 17 in accordance with the required torque TQ, the opening degree of the EGR control valve 23, the EGR rate, the air-fuel ratio, the injection start timing θS, the injection end timing θE, and the injection amount when performing low temperature combustion in the operating region I. Note that FIG. 26 also shows the opening degree etc. of the throttle valve 17 in the case of ordinary combustion performed in the operating region II.

From FIG. 25 and FIG. 26, when low temperature combustion is performed in the operating region I, the EGR rate is made 55 percent or more and the air-fuel ratio A/F is made a lean air-fuel ratio of 15.5 to 18 or so. Note that as explained above, when low temperature combustion is performed in the operating region I, even if the air-fuel ratio is made rich, almost no smoke is generated.

In this way, when low temperature combustion is being performed, it is possible to make the air-fuel ratio rich without generating almost any smoke. Therefore, when restoring the $NO_x$ purification action of the $NO_x$ storing and decomposing catalyst by making the air-fuel ratio of the exhaust gas rich, it is possible to perform low temperature combustion and make the air-fuel ratio rich under low temperature combustion.

Further, as explained above, if performing low temperature combustion, the exhaust gas temperature rises. Therefore, it is possible to ignite and burn the deposited particulate by performing low temperature combustion when the exhaust gas temperature should be raised.

As explained above, according to the present invention, it is possible to obtain a high $NO_x$ purification rate while securing a good fuel efficiency.

The invention claimed is:

1. An exhaust purification method of an internal combustion engine wherein combustion gas or burned gas in an engine combustion chamber or an exhaust gas exhausted from the engine combustion chamber is brought into contact with a $NO_x$ storing and decomposing catalyst, nitrogen oxide contained in these gases is adsorbed at the $NO_x$ storing and decomposing catalyst and disassociated to nitrogen and oxygen when burning fuel under a lean air-fuel ratio, the disassociated oxygen is held on the $NO_x$ storing and decomposing catalyst at this time, the disassociated nitrogen is separated from the $NO_x$ storing and decomposing catalyst, an energy necessary for purging part of the oxygen held on the $NO_x$ storing and decomposing catalyst from the $NO_x$ storing and decomposing catalyst is imparted to the $NO_x$ storing and decomposing catalyst to purge part of the oxygen held on the $NO_x$ storing and decomposing catalyst from the $NO_x$ storing and decomposing catalyst, and this purging action induces the remaining oxygen held on the $NO_x$ storing and decomposing catalyst to be purged from the $NO_x$ storing and decomposing catalyst, wherein oxygen defects formed in the carrier of the $NO_x$ storing and decomposing catalyst are given electrons. ultrastrong basic points are formed, and nitrogen monoxide contained in the gas is adsorbed at the ultrastrong basic points and disassociated to nitrogen and oxygen.

2. An exhaust purification method of an internal combustion engine as set forth in claim 1, wherein when the temperature of the $NO_x$ storing and decomposing catalyst is higher than a reference temperature determined by the $NO_x$ storing and decomposing catalyst, the remaining oxygen held on the $NO_x$ storing and decomposing catalyst is purged from the NO$_x$ storing and decomposing catalyst if imparting energy necessary for making part of the oxygen held on the NO$_x$ storing and decomposing catalyst separate from the NO$_x$ storing and decomposing catalyst to the NO$_x$ storing and decomposing catalyst.

3. An exhaust purification method of an internal combustion engine as set forth in claim 1, wherein the carrier of the NO$_x$ storing and decomposing catalyst has a crystal structure of zirconium oxide, part of the zirconium in this crystal structure is replaced by a trivalent rare earth metal selected from lanthanum, neodium, and samarium, the carrier has an alkali metal added to it, oxygen defects are formed by replacing the zirconium forming the zirconium oxide by a trivalent rare earth metal, and an alkali metal is used to given the oxygen defects electrons.

4. An exhaust purification method of an internal combustion engine as set forth in claim 1, wherein oxygen held on the NO$_x$ storing and decomposing catalyst is periodically purged from the NO$_x$ storing and decomposing catalyst by said energy being periodically imparted to the NO$_x$ storing and decomposing catalyst.

5. An exhaust purification method of an internal combustion engine as set forth in claim 4, wherein said energy is imparted to the NO$_x$ storing and decomposing catalyst when the total of the nitrogen monoxide adsorbed at the NO$_x$ storing and decomposing catalyst exceeds a predetermined set value.

6. An exhaust purification method of an internal combustion engine as set forth in claim 4, wherein the amount of energy imparted to the NO$_x$ storing and decomposing catalyst is reduced the higher the temperature of the NO$_x$ storing and decomposing catalyst.

7. An exhaust purification method of an internal combustion engine as set forth in claim 4, wherein the time interval from when the NO$_x$ storing and decomposing catalyst is imparted with energy to when it is next imparted with energy is increased the higher the temperature of the NO$_x$ storing and decomposing catalyst.

8. An exhaust purification method of an internal combustion engine as set forth in claim 4, wherein the NO$_x$ concentration in the exhaust gas passing through the NO$_x$ storing and decomposing catalyst is detected and said energy is imparted to the NO$_x$ storing and decomposing catalyst when this NO$_x$ concentration exceeds an allowable value.

9. An exhaust purification method of an internal combustion engine as set forth in claim 5, wherein said energy is heat energy.

10. An exhaust purification method of an internal combustion engine as set forth in claim 4, wherein said energy is generated by a reducing agent supplied in the combustion chamber or in the exhaust gas, and the reducing agent is supplied in the combustion chamber or in the exhaust gas and the air-fuel ratio of the combustion chamber or the air-fuel ratio of the exhaust gas is made rich when purging the oxygen held on the NOx storing and decomposing catalyst from the NO$_x$ storing and decomposing catalyst.

11. An exhaust purification method of an internal combustion engine as set forth in claim 10, wherein the time interval from when the air-fuel ratio of the combustion chamber or the air-fuel ratio of the exhaust gas is made rich for purging the oxygen held on the NO$_x$ storing and decomposing catalyst to when the air-fuel ratio of the combustion chamber or the air-fuel ratio of the exhaust gas is made rich the next time is increased the higher the temperature of the NO$_x$ storing and decomposing catalyst.

12. An exhaust purification method of an internal combustion engine as set forth in claim 10, wherein the amount of reducing agent when the air-fuel ratio of the combustion chamber or the air-fuel ratio of the exhaust gas is made rich for purging oxygen held on the NO$_x$ storing and decomposing catalyst is smaller than the amount of the reducing agent necessary for reducing the nitrogen monoxide generated in the time interval from when the air-fuel ratio of the combustion chamber or the air-fuel ratio of the exhaust gas is made rich the previous time to when the air-fuel ratio of the combustion chamber or the air-fuel ratio of the exhaust gas is made rich the current time.

13. An exhaust purification method of an internal combustion engine as set forth in claim 12, wherein the amount of reducing agent supplied for purging the oxygen held on the NO$_x$ storing and decomposing catalyst is reduced the higher the temperature of the NO$_x$ storing and decomposing catalyst.

14. An exhaust purification apparatus of an internal combustion engine wherein a NO$_x$ storing and decomposing catalyst, adsorbing nitrogen oxide contained in combustion gas or burned gas and disassociating it to nitrogen and oxygen when burning fuel under a lean air-fuel ratio and, at this time, holding the disassociated oxygen and separating the disassociated nitrogen, is arranged in an engine combustion chamber or engine exhaust passage, energy imparting means for imparting to the NO$_x$ storing and decomposing catalyst the energy necessary for purging part of the oxygen held on the NO$_x$ storing and decomposing catalyst is provided, the energy necessary for purging part of the oxygen held on the NO$_x$ storing and decomposing catalyst from the NO$_x$ storing and decomposing catalyst is imparted to the NO$_x$ storing and decomposing catalyst to purge part of the oxygen held on the NO$_x$ storing and decomposing catalyst from the NO$_x$ storing and decomposing catalyst, and this purging action induces the remaining oxygen held on the NO$_x$ storing and decomposing catalyst to be purged from the NO$_x$ storing and decomposing catalyst, wherein a carrier of the NO$_x$ storing and decomposing catalyst is formed with oxygen defects, the oxygen defects are given electrons, ultrastrong basic points are formed, and nitrogen monoxide contained in the combustion gas or burned gas is adsorbed on the ultrastrong basic points and disassociated to nitrogen and oxygen.

15. An exhaust purification apparatus of an internal combustion engine as set forth in claim 14, wherein when the temperature of the NO$_x$ storing and decomposing catalyst is higher than a reference temperature determined by the NO$_x$ storing and decomposing catalyst, the remaining oxygen held on the NO$_x$ storing and decomposing catalyst is purged from the NO$_x$ storing and decomposing catalyst if imparting energy necessary for making part of the oxygen held on the NO$_x$ storing and decomposing catalyst separate from the NO$_x$ storing and decomposing catalyst to the NO$_x$ storing and decomposing catalyst.

16. An exhaust purification apparatus of an internal combustion engine as set forth in claim 14, wherein the carrier of the NO$_x$ storing and decomposing catalyst has a crystal structure of zirconium oxide, part of the zirconium in this crystal structure is replaced by a trivalent rare earth metal selected from lanthanum, neodium, and samarium, the carrier has an alkali metal added to it, oxygen defects are formed by replacing the zirconium forming the zirconium oxide with a trivalent rare earth metal, and an alkali metal is used to give oxygen defects electrons.

17. An exhaust purification apparatus of an internal combustion engine as set forth in claim 14, wherein the engine exhaust passage is provided with a particulate filter for treating the particulate in the exhaust gas, and the NO$_x$ storing and decomposing catalyst is carried on the particulate filter.

18. An exhaust purification apparatus of an internal combustion engine as set forth in claim 14, wherein said energy is generated by a reducing agent supplied to the combustion chamber or exhaust gas, and the oxygen held on the $NO_x$ storing and decomposing catalyst is periodically purged from the $NO_x$ storing and decomposing catalyst by having a reducing agent periodically supplied to the combustion chamber or exhaust gas and having the air-fuel ratio of the combustion chamber or the air-fuel ratio of the exhaust gas periodically be made rich.

19. An exhaust purification apparatus of an internal combustion engine as set forth in claim 18, wherein when the total amount of the nitrogen monoxide adsorbed on the $NO_x$ storing and decomposing catalyst exceeds a predetermined set amount, the reducing agent is supplied in the combustion chamber or exhaust gas and the air-fuel ratio of the combustion chamber or the air-fuel ratio of the exhaust gas is made rich.

20. An exhaust purification apparatus of an internal combustion engine as set forth in claim 18, wherein the time interval from when the air-fuel ratio of the combustion chamber or the air-fuel ratio of the exhaust gas is made rich for purging the oxygen held on the $NO_x$ storing and decomposing catalyst to when the air-fuel ratio of the combustion chamber or the air-fuel ratio of the exhaust gas is next made rich is increased the higher the temperature of the $NO_x$ storing and decomposing catalyst.

21. An exhaust purification apparatus of an internal combustion engine as set forth in claim 18, wherein a $NO_x$ concentration sensor for detecting the $NO_x$ concentration in the exhaust gas passing through the $NO_x$ storing and decomposing catalyst is provided, and a reducing agent is supplied in the combustion chamber or exhaust gas and the air-fuel ratio of the combustion chamber or the air-fuel ratio of the exhaust gas is made rich when the $NO_x$ concentration detected by the $NO_x$ concentration sensor exceeds an allowable value.

22. An exhaust purification apparatus of an internal combustion engine as set forth in claim 18, wherein the amount of the reducing agent when the oxygen held on the $NO_x$ storing and decomposing catalyst is purged by having the air-fuel ratio of the combustion chamber or the air-fuel ratio of the exhaust gas made rich is made smaller than the amount of the reducing agent necessary for reducing the nitrogen monoxide generated in the time interval from when the air-fuel ratio of the combustion chamber or the air-fuel ratio of the exhaust gas is made rich the previous time to when the air-fuel ratio of the combustion chamber or the air-fuel ratio of the exhaust gas is made rich the current time.

23. An exhaust purification apparatus of an internal combustion engine as set forth in claim 22, wherein the amount of reducing agent supplied for purging the oxygen held on the $NO_x$ storing and decomposing catalyst is reduced the higher the temperature of the $NO_x$ storing and decomposing catalyst.

* * * * *